US009852647B2

(12) United States Patent
Rangan et al.

(10) Patent No.: US 9,852,647 B2
(45) Date of Patent: *Dec. 26, 2017

(54) SYSTEM AND METHOD FOR SYNTHESIZING AND PRESERVING CONSISTENT RELATIVE NEIGHBORHOOD POSITION IN MULTI-PERSPECTIVE MULTI-POINT TELE-IMMERSIVE ENVIRONMENTS

(71) Applicant: Amrita Vishwa Vidyapeetham, Tamil Nadu (IN)

(72) Inventors: P. Venkat Rangan, Tamil Nadu (IN); Balaji Hariharan, Kerala (IN); Ramkumar Narayanankutty, Kerala (IN); Uma Gopalakrishnan, New Delhi (IN)

(73) Assignee: Amrita Vishwa Vidyapeetham (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,604

(22) Filed: Jun. 13, 2016

(65) Prior Publication Data
US 2016/0300500 A1    Oct. 13, 2016

Related U.S. Application Data

(63) Continuation-in-part of application No. 14/216,083, filed on Mar. 17, 2014, now Pat. No. 9,386,271.

(30) Foreign Application Priority Data

Aug. 30, 2013  (IN) ............................ 3888/CHE/2013

(51) Int. Cl.
*H04N 7/14*   (2006.01)
*G09B 5/10*   (2006.01)
(Continued)

(52) U.S. Cl.
CPC ............... *G09B 5/10* (2013.01); *G09B 5/067* (2013.01); *G09B 5/14* (2013.01); *H04N 7/142* (2013.01); *H04N 7/147* (2013.01); *H04N 7/15* (2013.01)

(58) Field of Classification Search
CPC . G09B 5/067; G09B 5/10; G09B 5/14; G06K 9/00355
(Continued)

(56) References Cited

U.S. PATENT DOCUMENTS 5,555,443 A * 9/1996 Ikehama ............... H04N 7/144
                                                348/14.09
8,208,002 B2 * 6/2012 Saleh ...................... G09B 5/06
                                                348/14.01
(Continued)

*Primary Examiner* — Hemant Patel
(74) *Attorney, Agent, or Firm* — Donald R. Boys; Central Coast Patent Agency, Inc

(57) ABSTRACT

An e-learning system has a local classroom comprising a local student station and an instructor station, such that local students at the local student station and an instructor at the instructor station face each other directly along a first viewing line, a plurality of remote classrooms each having a student station, video cameras in each of the remote classrooms positioned and oriented to capture video images of subjects, video displays in the local classroom arranged along a line orthogonal to the first viewing line and all facing the local student station, in sets of at least two displays, arranged vertically one above another, each first set of at least two displays dedicated to one of the remote classrooms, a second plurality of video displays like the first, but facing the instructor, connection apparatus between classrooms, a server coordinating video feeds with displays.

9 Claims, 20 Drawing Sheets

(51) Int. Cl.
*H04N 7/15* (2006.01)
*G09B 5/14* (2006.01)
*G09B 5/06* (2006.01)

(58) Field of Classification Search
USPC .................. 348/14.01–14.16; 370/259–271, 370/351–357; 709/201–207, 217–248
See application file for complete search history.

(56) References Cited

U.S. PATENT DOCUMENTS

| | | | | |
|---|---|---|---|---|
| 2006/0228692 | A1* | 10/2006 | Seshadri | G09B 5/065 434/365 |
| 2010/0279266 | A1* | 11/2010 | Laine | G06Q 10/10 434/350 |
| 2016/0295168 | A1* | 10/2016 | Rangan | H04N 7/152 |

* cited by examiner

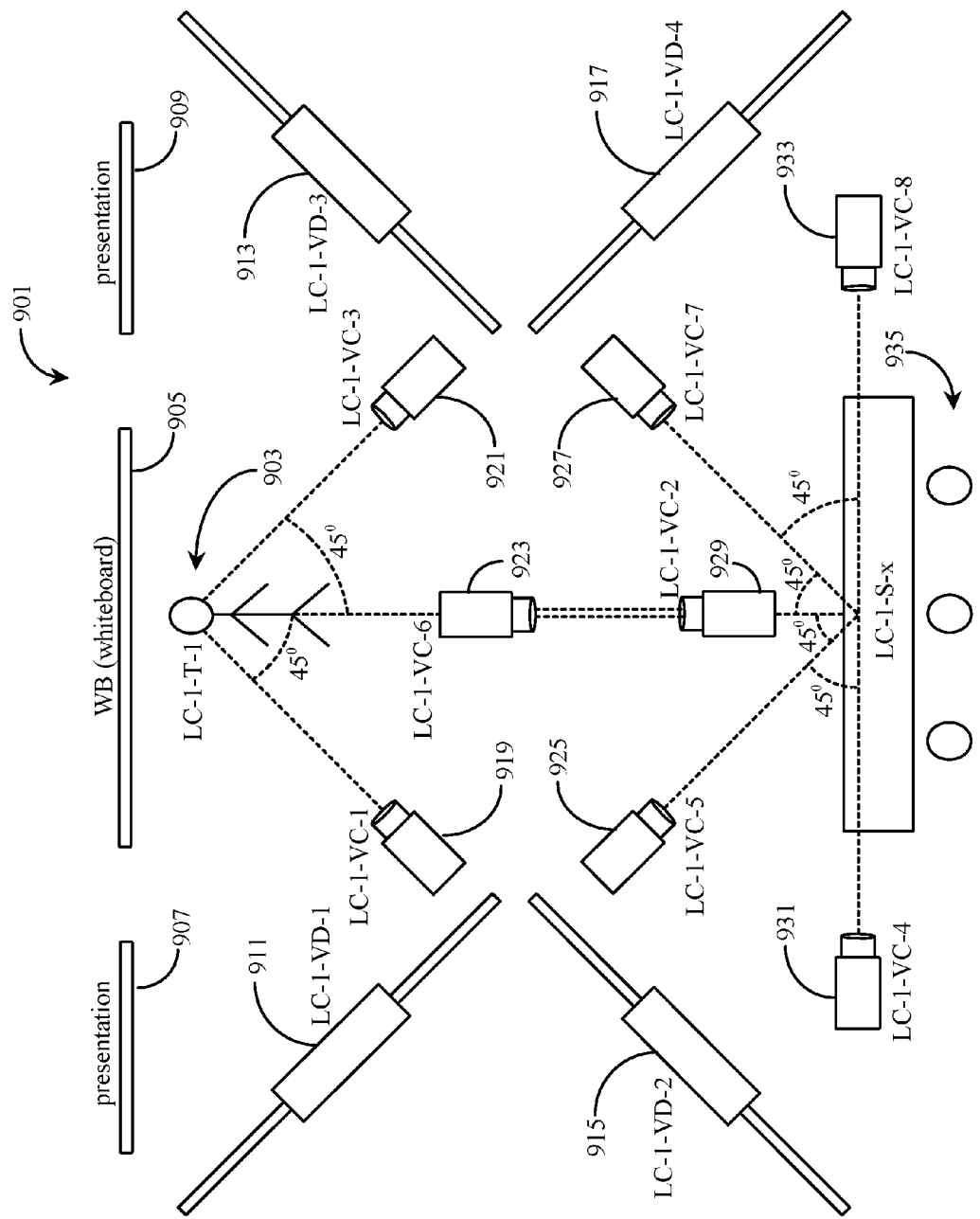
*Fig. 9 - Local Classroom #1*

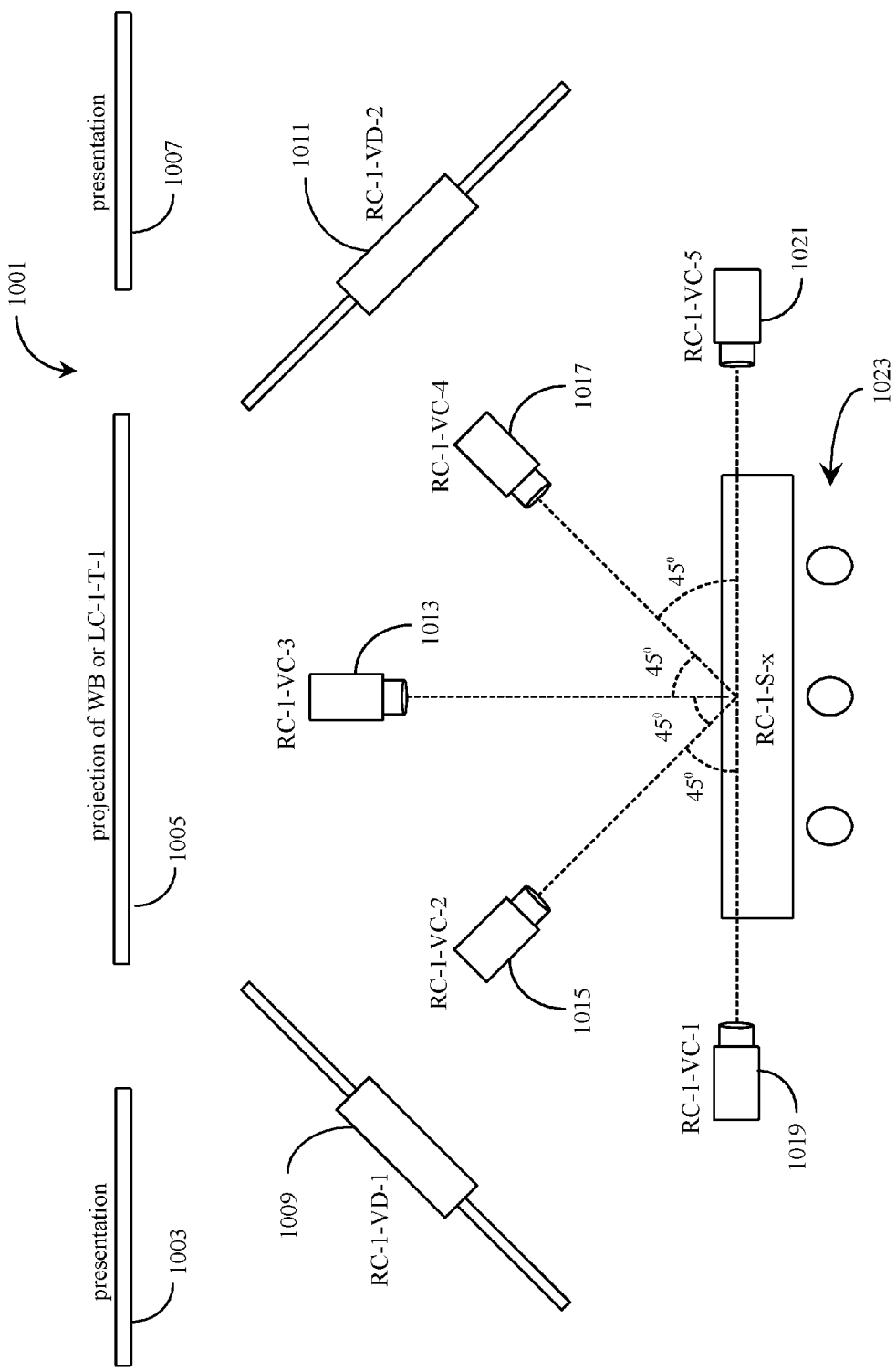

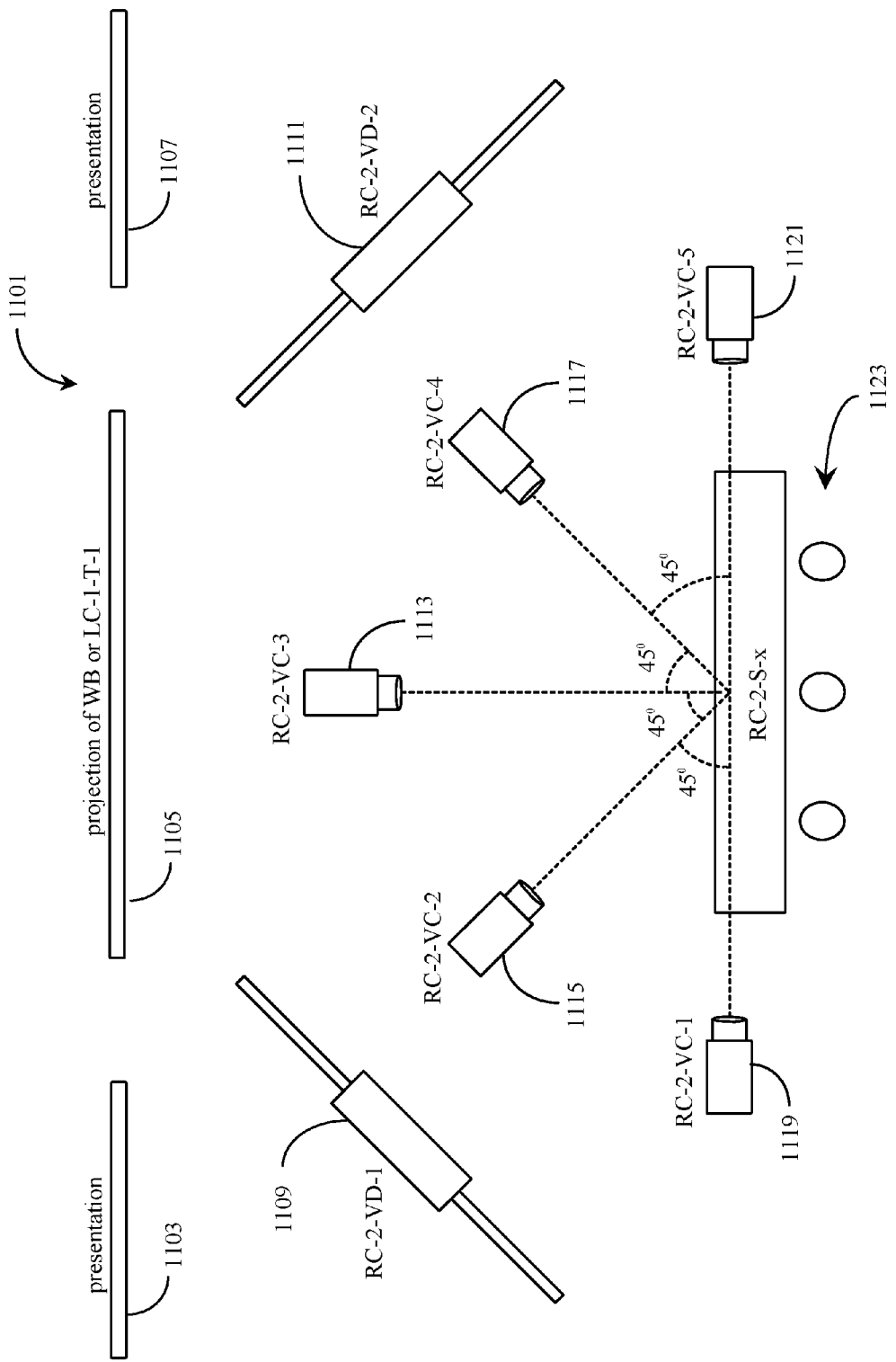
Fig. 11 - Remote Classroom #2

| INFO SOURCE | INFO SINK | WB | DISPLAY | | | |
|---|---|---|---|---|---|---|
| | | | LC-1-VD-2 | LC-1-VD-4 | LC-1-VD-1 | LC-1-VD-3 |
| LC-1-T-1 | * | -- | RC-1-VC-5 | RC-2-VC-1 | RC-1-VC-3 | RC-2-VC-3 |
| LC-1-T-1 | RC-1-S-x | -- | RC-1-VC-1 | RC-2-VC-1 | RC-1-VC-3 | RC-2-VC-3 |
| LC-1-T-1 | LC-1-S-x | -- | RC-1-VC-2 | RC-2-VC-4 | RC-1-VC-4 inv* | RC-2-VC-2 inv* |
| LC-1-T-1 | RC-2-S-x | -- | RC-1-VC-5 | RC-2-VC-1 | RC-1-VC-3 | RC-2-VC-3 |
| LC-1-S-x | RC-1-S-x | | RC-1-VC-2 | RC-1-VC-3 | RC-1-VC-4 inv* | RC-2-VC-3 |
| RC-1-S-x | LC-1-S-x | | RC-1-VC-2 | RC-2-VC-3 | RC-1-VC-4 inv* | RC-2-VC-2 |
| LC-1-S-x | RC-2-S-x | | RC-1-VC-2 | RC-2-VC-4 | RC-1-VC-4 inv* | RC-2-VC-2 inv* |
| RC-2-S-x | LC-1-S-x | | RC-1-VC-5 | RC-2-VC-4 | RC-2-VC-3 | RC-2-VC-2 inv* |
| RC-1-S-x | RC-2-S-x | | RC-1-VC-5 | RC-2-VC-1 | RC-1-VC-3 | RC-2-VC-3 |

*inv = laterally inverted projection

Local Classroom

*Fig. 12*

| INFO SOURCE | INFO SINK | DISPLAY WB | DISPLAY | DISPLAY |
|---|---|---|---|---|
| LC-1-T-1 | * | | RC-1-VD-1 | RC-1-VD-2 |
| LC-1-T-1 | RC-1-S-x | LC-1-VC-2 | LC-1-VC-8 | RC-2-VC-1 |
| LC-1-T-1 | LC-1-S-x | LC-1-VC-1 | LC-1-VC-2 | RC-2-VC-2 |
| LC-1-T-1 | RC-2-S-x | LC-1-VC-3 | LC-1-VC-8 | RC-2-VC-3 |
| LC-1-S-x | RC-1-S-x | LC-1-VC-2 | LC-1-VC-2 | RC-2-VC-1 |
| RC-1-S-x | LC-1-S-x | | LC-1-VC-2 | RC-2-VC-3 |
| LC-1-S-x | RC-2-S-x | | LC-1-VC-8 | RC-2-VC-2 |
| RC-1-S-x | RC-2-S-x | | LC-1-VC-2 | RC-2-VC-3 |
| RC-1-S-x | LC-1-S-x | | LC-1-VC-2 | RC-2-VC-2 |
| RC-2-S-x | RC-1-S-x | | LC-1-VC-8 | RC-2-VC-2 |

1301

Remote Classroom 1

*Fig.13*

|  |  | DISPLAY | | |
| --- | --- | --- | --- | --- |
| INFO SOURCE | INFO SINK | WB | RC-2-VD-1 | RC-2-VD-2 |
| LC-1-T-1 | * |  | RC-2-VD-1 | RC-2-VD-2 |
| LC-1-T-1 | RC-1-S-x | LC-1-VC-2 | RC-1-VC-5 | LC-1-VC-4 |
| LC-1-T-1 | LC-1-S-x | LC-1-VC-2 | RC-1-VC-3 | LC-1-VC-4 |
| LC-1-T-1 | RC-2-S-x | LC-1-VC-1 | RC-1-VC-3 | LC-1-VC-4 |
| LC-1-T-1 | RC-1-S-x | LC-1-VC-3 | RC-1-VC-4 | LC-1-VC-7 |
| LC-1-S-x | RC-2-S-x |  | RC-1-VC-3 | LC-1-VC-4 |
| LC-1-S-x | LC-1-S-x |  | RC-1-VC-3 | LC-1-VC-7 |
| RC-2-S-x | RC-2-S-x |  | RC-1-VC-4 | LC-1-VC-7 |
| RC-1-S-x | RC-1-S-x |  | RC-1-VC-4 | LC-1-VC-4 |
| RC-2-S-x | RC-1-S-x |  | RC-1-VC-4 | LC-1-VC-7 |

Remote Classroom 2

*Fig. 14*

Fig. 21 Classroom 3

SYSTEM AND METHOD FOR SYNTHESIZING AND PRESERVING CONSISTENT RELATIVE NEIGHBORHOOD POSITION IN MULTI-PERSPECTIVE MULTI-POINT TELE-IMMERSIVE ENVIRONMENTS

CROSS-REFERENCE TO RELATED DOCUMENTS

The present patent application is a continuation-in-part to non-provisional application Ser. No. 14/216,083, filed Mar. 17, 2014, which claims priority to Indian application 3888/CHE/2013, filed Aug. 30, 2013. Disclosure of the priority documents is incorporated herein in by reference.

BACKGROUND OF THE INVENTION

1. Field of the Invention

The present invention relates generally to the field of video conferencing, and pertains particularly to systems and methods for synthesizing and preserving consistent relative neighborhood positions in multi-perspective multi-point tele-immersive environments.

2. Discussion of the State of the Art

Video camera and audio systems were developed in the past for improving communication among individuals who are separated by distance and/or time. Such systems and processes are now referred to as videoconferencing, which provide simultaneous interaction between participants located in two or more remote locations, where sounds and visions are transmitted in real time between the participants through audio and video channels. Today's systems and processes seek to duplicate, to the maximum extent possible, the full range, level and intensity of interpersonal communication and information sharing which would occur if all of the participants of a meeting or lecture, for example, were "face-to-face" in the same room at the same time.

Videoconferencing technology has been routinely used for high profile remote location business meetings by multinational organizations for many years. However, due to the significant increase in Internet access throughout the world, the use of videoconferencing as a tool to communicate has extensively increased in areas as diverse as commerce and education.

In addition to obvious advantages of videoconferencing in terms of cost savings in travel, time, etc., videoconferencing provides a main advantage by enabling new methods of communication. Such videoconferencing environments can be utilized to enhance the learning experience in classrooms, for example, by linking several schools together with a common instructor, bringing both instructor and all students together onto a single virtual platform.

In an era where quality education is in high demand, there is a large difference between supply and demand of skilled instructors, creating a dearth of skilled instructors specializing in focused areas. Thus, "e-learning" as termed in the current art, will inevitably become the solution to these issues. E-learning has been the focus of vast research and development, but a dearth of solutions exists today for the many challenges still needing to be addressed and resolved. Several established e-learning technologies exist today which have proven their efficiency and impact on videoconferencing, and such technologies have begun to advance to the educational area where an instructor can teach students by ensuring quality education. By utilizing e-learning solutions, a single instructor or teacher can bring courses to a large number of geographically displaced students by modeling an e-learning classroom to enhance the immersive experience during the learning process.

However, in state of the art e-learning applications, the teacher does not feel that the remote students are part of the physical local classroom. Further, the students in the remote locations are disadvantaged through lack of cognitive and social presence. Still further, the participants are forced to use interaction techniques that are not geographically transparent. In a geographically transparent system, all of the participants are able to interact as if they were present in the same physical location i.e., face-to-face in the same room at the same time.

Despite being touted as the replacement for face-to-face communication, state of the art videoconferencing systems in e-learning applications are not suitable for tele-immersive, tele-presence interactive environments where the participants interact with each other very closely over a period of time. Such systems of current art include large format multi-display high definition videoconferencing systems, comprising at least as many 2 dimension (2D) video capture cameras as display screens, where regular 2D video is sent to each screen from it's corresponding local camera in use.

Behavioral scientists know well that interpersonal communications involve a large number of such subtle and complex non-verbal visual cues, and in particular those such as gaze and eye contact are well-known to provide additional information over and above the spoken words and explicit gestures. Gaze relates to others being able to see where a person is looking, and eye contact relates to the gazes of two persons being directed at the eyes of the other. The cues are, for the most part, processed subconsciously by the persons and often communicate vital information up and above the spoken word.

A handful of videoconferencing tele-presence systems exist today for distance education, but such systems can capture only one kind of human-to-human interaction i.e., student-teacher interaction and many restrictions are imposed on teacher and student in attempts to make the environment realistic. For example, currently employed videoconferencing systems are relatively poor at conveying non-verbal communications such as, and most importantly, eye contact and gaze, or other communications involving hand gestures, finger pointing and the like. Such gestures are seen as important in interpersonal communications, and are key in establishing a sense of immersion in a teleconferencing e-learning environment. Further, such systems do not facilitate a natural and unbridled interaction between participants who are geographically dispersed. The inability of such systems to synthesize relative neighborhood of the participants such that coherent and consistent interaction may occur as in a real life environment, remains a major drawback.

Numerous hardware systems exist in today's market that are designed for correcting eye gaze and contact issues, and others have attempted to provide solutions that realize the benefits of face-to-face contact utilizing "robotic" tele-presence, wherein a remotely located person is "recreated" at the site of a meeting or classroom where the participants are located, utilizing a remotely-controlled robot that simulates the presence of a user. However, such systems are bulky, expensive and lack scalability to implementations covering larger fields of view or to preserve gaze, and eye contact has been preserved over only a small scale of view and restricted to preserving such interaction between only a small number of participants such as two or possibly a few.

Eye contact is much more important when many more than two participants interact with each other, since eye contact in particular can be used for selecting participants and signifying attention. Gaze is also important in human interactions because it lets a person know that other participants are paying attention to a person such as an instructor or particular student in a classroom for example, and can also be used to arbitrate taking turns in a conversation.

However, the presence of gaze, eye-contact and other physical gestures is not adequately preserved in prior videoconferencing systems. Solutions to problems of this sort have long been sought, but have long-eluded those skilled in the art. Hence, to address these and other such problems, a new and unique interactive e-learning classroom architecture and software design is clearly needed in solving the inherent state of the art problems as discussed in current systems.

BRIEF SUMMARY OF THE INVENTION

In one embodiment of the invention an e-learning system is provided comprising a local classroom comprising a local student station, including a local student microphone, and an instructor station, including an instructor microphone, such that local students at the local student station and an instructor at the instructor station face each other directly along a first viewing line, a plurality of remote classrooms of a specific number, each having a student station, a remote student microphone, and an instructor display, including an instructor audio speaker, such that remote students are enabled to view the instructor display, a plurality of video cameras in each of the local and remote classrooms, individual ones of the video cameras positioned and oriented to capture video images of the instructor, the local students and the remote students as subjects, a first plurality of video displays in the local classroom arranged along a line orthogonal to the first viewing line and all facing the local student station, the first plurality of video displays comprising first sets of at least two displays, arranged vertically one above another, each first set of at least two displays dedicated to one of the remote classrooms, with an equal number of sets positioned side-by-side to each side of the first viewing line, a second plurality of video displays in the local classroom arranged along the line orthogonal to the first viewing line and all facing the instructor station, the second plurality of video displays comprising second sets of at least two displays, arranged vertically one above another, each second set of at least two displays dedicated to one of the remote classrooms, with an equal number of sets positioned side-by-side to each side of the first viewing line, and with first and second sets dedicated to the same remote classroom positioned back to back, first sets facing the student station and second sets facing the instructor station, first connection apparatus at the local classroom connecting electronic elements of the local classroom to a network, second connection apparatus at each of the remote classrooms connecting electronic elements of the remote classrooms to the network, and a server having a processor executing coded instructions from a non-transitory physical medium, the server connected through the network to the first and second connection apparatus, the server executing the software coordinating video and audio transmission between the classrooms. Feeds from the plurality of video cameras are mapped to individual sets of the first and second plurality of the video displays, with different video feeds of a same subject, but having a different viewpoint of that subject, mapped to each of the at least two displays in each set, providing a variable view of the same subject for a viewer.

In one embodiment the system operates in exclusive states, and in a first exclusive state the instructor lectures to both the local students and the remote students. Also in one embodiment a second exclusive state the instructor engages exclusively with one or more students in a specific one of the remote classrooms. Also in one embodiment, in a third exclusive state the instructor interacts exclusively with one or more of the local students. Also in one embodiment, in a fourth exclusive state one of the local students and one of the first remote students interact with one another. The network may be the Internet network.

In one embodiment each set of video displays comprises two displays dedicated to a common subject, one display above the other in a common plane. Also in one embodiment each set of video displays comprises three or more displays dedicated to a common subject, arranged vertically, one above another in the set. And in one embodiment, among the plurality of video cameras, a sub-set of video cameras is arranged in each of the remote classrooms patterned in an array as on an interior surface of a hemisphere.

BRIEF DESCRIPTION OF THE SEVERAL VIEWS OF THE DRAWINGS

In order to provide a more complete understanding of the present disclosure and features and advantages thereof, reference is made to the following description, taken in conjunction with the accompanying figures, wherein the reference numerals represent like parts in which:

FIG. 9 is a block diagram illustrating a local tele-immersive environment according to an embodiment of the invention.

FIG. 10 is a block diagram illustrating a first remote tele-immersive environment according to an embodiment of the invention.

FIG. 11 is a block diagram illustrating a second tele-immersive environment according to an embodiment of the invention.

FIG. 12 is a table illustrating device mapping for the local tele-immersive environment of FIG. 9 according to an embodiment of the invention.

FIG. 13 is a table illustrating device mapping for the first remote tele-immersive environment of FIG. 10 according to an embodiment of the invention.

FIG. 14 is a table illustrating device mapping for the second tele-immersive environment of FIG. 11 according to an embodiment of the invention.

DETAILED DESCRIPTION OF THE INVENTION

Figure 1:
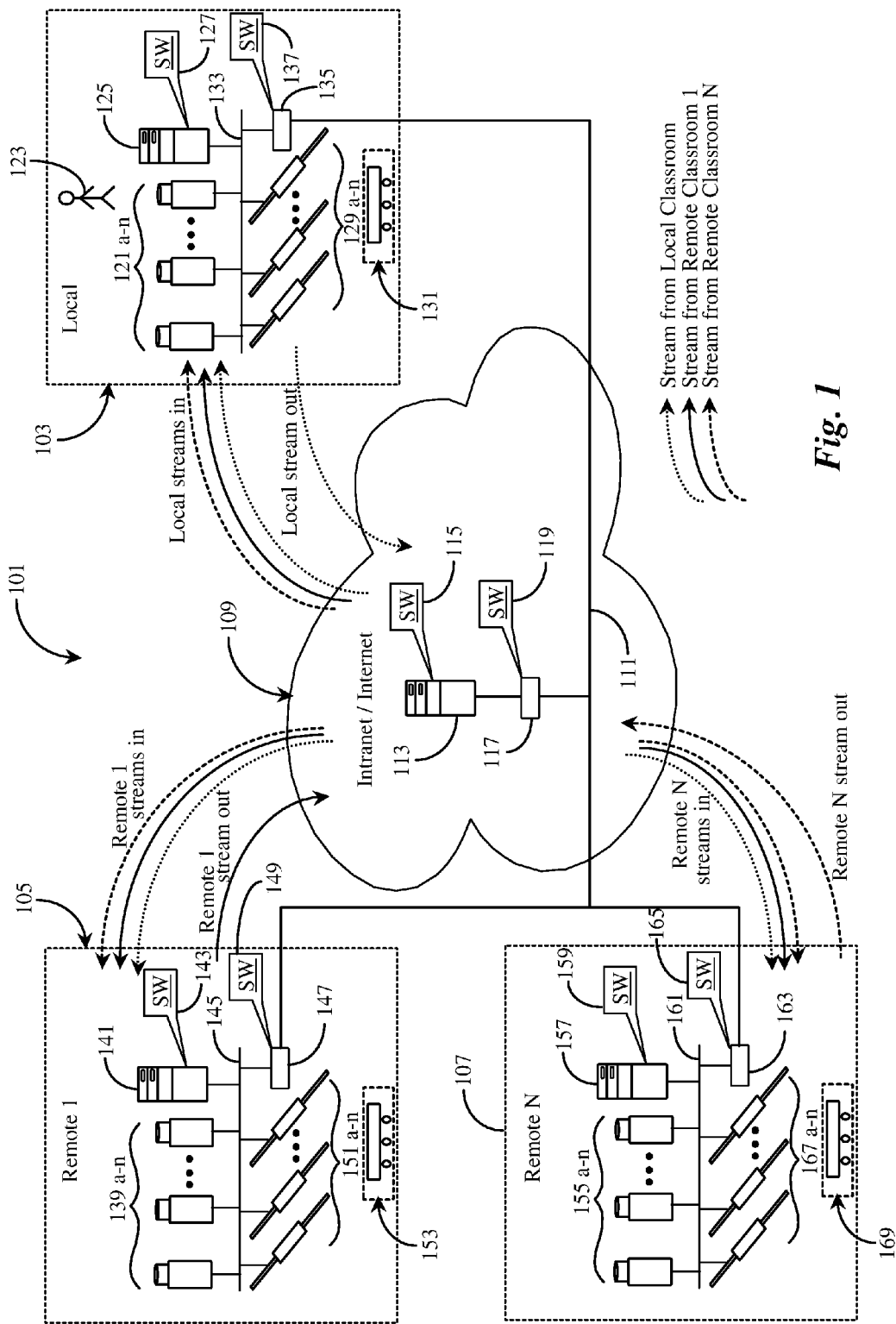
FIG. 1 is a block diagram of a network-based videoconferencing system which may be used to implement multi-perspective, multi-point tele-immersive local and remote e-learning environments according to embodiments of the invention.

The invention relates generally to the field of video conferencing, and pertains particularly to systems and methods for synthesizing and preserving consistent relative neighborhood positions in multi-perspective multi-point tele-immersive environments. In order to obviate the drawbacks of existing video telecommunication systems in state of the art e-learning environments, an important object of the present invention is to provide a system and method for synthesizing and preserving consistent relative neighborhood positions in multi-perspective multi-point tele-immersive environments providing time-varying perspectives for different participants according to the types of interaction in which they are involved.

The inventors of the present application provide a unique and advantageous system for enhancing the telecommunicating participant's sense of immersion and communication effectiveness in tele-immersive environments including local and remote telecommunication environments. The invention may be practiced in a variety of such environments including business and sales meetings, or other environments where human interaction is broadcast between local and remote locations. However, the present invention is particularly suited for e-learning classroom environments where teacher-student interaction takes place and the following description in the specification therefore pertains to such application.

The inventors, through empirical research involving a series of classroom experiments and evaluation of results have gained much understanding of what constitutes an effective e-learning environment wherein teachers and students may interact remotely with each other as though they were face-to-face in the same local classroom. The results, as are described below in enabling detail, prove that the classroom designs and software implementation of the present invention should be such that the environment experienced by both teacher an students is as close to that of a "real classroom" as possible, and that the students of a local classroom feel as though they are in the presence and in the same room as the students in the remote locations, and further that the students in remote classrooms feel as though they are in the presence of the local teacher and students in the local and other remote classrooms.

In the following detailed description of embodiments of the present invention numerous specific details are set forth in order to provide a thorough understanding of the invention. However, it will be apparent to those skilled in the art that the invention may be practiced without all of these specific details without departing form the scope and spirit of the invention. In other instances, well-known methods, procedures, components and circuitry are not described in detail in order to avoid unnecessarily obscuring the new and novel aspects of the invention. Any or all of the software (SW) applications and/or servers in the following description can be single, clustered or load-balanced to allow scaling up the system capacity and/or improving system reliability.

The system of the present invention is provided for enhancing the classroom participants' sense of tele-immersion as if the teacher in a local classroom and the students in the local classroom as well as those of one or more remote classrooms were in the same room interacting face-to-face. Such immersive interaction may be between teacher and student or between students.

The system generally includes a plurality of video cameras arranged in a particular pattern including gesture recognition mechanisms and trigger-based camera feed switching. Arrays of cameras are arranged in particular patterns in a classroom depending on whether the classroom is local or remote, wherein one array is directed to a local or remote classroom of students and another array is directed to a teacher at stand in a local classroom. The system also includes a plurality of large video displays in the local and remote classrooms which render the video feed captured by the camera arrays. Groupings of the video capture and display devices may be construed as capture and display "stations".

One or more computing nodes which are dedicated servers are implemented in each of the local and remote classrooms and execute software applications which locate participants in the physical space and recognize physical gestures of both parties (teacher/students). A mapping node is also incorporated in each of the local and remote classrooms which calculates a feed switching matrix for a specific interaction type, the calculation based on the specific gestures. Triggers are sent to the video capture and display stations for pairing of the capture and display devices. The mapping is performed in multicast mode between local and remote classrooms, and interaction tables ensure proper generation of the feed-display matrix. More specific detail pertaining to gesture recognition, feed switching, mapping and gaze correction and alignment are provided in further enabling detail subsequently in the specification.

FIG. 1 illustrates a basic system configuration in which the present invention may be implemented in accordance with a preferred embodiment. System 101 is a client-server Internet-based videoconferencing system generally including Internet cloud 109, and a plurality of classrooms wherein teacher/student interaction occurs. Classroom 103 is labeled "Local" in the illustration, and represents a local classroom e-learning environment comprising a teacher/instructor 123, hereinafter termed teacher, one or a plurality of students represented by element 131, a plurality of digital video capture devices 121 *a-n*, hereinafter termed cameras, a plurality of digital display devices 129 *a-n*, hereinafter termed displays, a computerized server 125 and a service gateway 135. Classroom 103 is a network environment wherein the plurality of networked devices comprising cameras 121, displays 129, server 127 and gateway 135 are connected via a local area network (LAN) 133 which in a preferred embodiment is a high-speed LAN, and which may be a wireless network or any other suitable high-speed digital connection network. Unique software applications 127 and 137 are installed and execute on server 125 and gateway 135 respectively. It should be noted that the arrangement and number of video capture and display devices illustrated for local classroom 103 is not representative of the specific arrangement and number of devices in a classroom design according to a preferred embodiment of the invention, rather; the illustration is solely for the purpose of exemplary depiction of the elements present in classroom 103. Specific classroom design is more accurately shown and described for an implementation of the invention in the specification with respect to FIG. 9.

Classroom 105 is labeled "Remote 1" in FIG. 1, and represents a remote classroom e-learning environment located in a different geographic location than that of local classroom 103. Classroom 105 comprises networked devices similar to that of local classroom 103, including an array of cameras 139a-n, displays 151a-n, server 141 and a service gateway 147, said networked devices interconnected via LAN 145. Unique software applications 143 and 149 are installed and execute on server 141 and gateway 147 respectively. Classroom 105 also comprises a plurality of students 153. The noted exception to the similarities between remote classroom 105 and local classroom 103 is the absence of a teacher/instructor. It is noted here also that the arrangement and number of video capture and display devices illustrated for local classroom 105 is not representative of the specific arrangement and number of devices in a classroom design according to a preferred embodiment of the invention, rather; the illustration is solely for the purpose of exemplary depiction of the elements present in classroom 105. Specific classroom design is more accurately shown and described below in this specification with reference to FIG. 10.

Classroom 107 is labeled "Remote N" in the illustration, and represents one or a plurality of remote classroom e-learning environments located in a different geographic location than that of local classroom 103 or remote classroom 105. Classroom 107 comprises networked devices similar to that of local classroom 103 and remote classroom 105, including an array of cameras 155a-n, displays 167a-n, server 157 and service gateway 163, said networked devices interconnected via LAN 161. Unique software applications 159 and 165 are installed and execute on server 157 and gateway 163 respectively. Classroom 107 also comprises a plurality of students 169. As with remote classroom 105, the noted exception to the similarities between remote classroom 107 and local classroom 103 is the absence of a teacher/instructor. It is also noted here that the arrangement and number of video capture and display devices illustrated for local classroom 107 is not representative of the specific arrangement and number of devices in a classroom design according to a preferred embodiment of the invention, rather; the illustration is solely for the purpose of exemplary depiction of the elements present in classroom 107. Specific classroom design is accurately shown and described in the specification with respect to FIG. 11.

Network cloud 109 represents a digital wide-area-network (WAN) such as the Internet network as is well known in the art. Line 111 is a network backbone which represents all of the lines, equipment, access points and packet-routing capability that make up the Internet as a whole. Therefore, there are no geographic limitations in practicing the invention. Network 109 may include the Internet network and any sub-networks that may provide access to the network and packet routing capability physically represented herein by line 111.

In this example network line 111 serves as a carrier network for interconnectivity between the local and remote classrooms. Server 113 executing software 115 is an Internet-connected Web server which may be leased or hosted by an enterprise providing the videoconferencing services and applications of the present invention, and may include a Web site (not illustrated) that may serve as a service access point (SAP) for subscribing clients of an enterprise hosting services of the present invention.

Session architecture of the present invention is based on an end-system overlay network with two hierarchical levels which are a local level and a global level. At the local level, communication in each tele-immersive environment in their respective classroom is managed by the service gateways; gateway 135 for Local classroom 103, gateway 147 for Remote 1 classroom 105 and gateway 163 for Remote N classroom 107. Each service gateway consists of one or more processors and software. After bootstrapping of the local environment is completed, the local service gateway registers with central session controller 117 at the Internet level (109) through line 111. Session controller 117 has software 119 executing thereon providing functionality for globally organizing the multi-party communications. At the global level, server 113 has connection to network line 111 for communication and access purposes, and serves as a master switching coordinator at the global level. In one embodiment server 113 globally coordinates the feeds and switching for all of the local and remote capture and display devices of the multipoint classroom participation (MCP) environment.

One embodiment of the present invention pertains to a method for correcting gaze alignment in multi-point video conferencing systems using an observer-dependent vector (ODV) system. Another embodiment pertains to video capture and display device arrangement architecture for remote learning environments which maintains the relative neighborhood positions of all participants (teacher/students). Gaze alignment correction according to a preferred embodiment utilizes a unique ODV system to calculate the gaze correction factor before transforming the 3D objects into 2D projection space.

The aforementioned method of the invention includes using a coordinate system for locating and defining the objects in a 3D environment, a set of vector definitions and the behavior of vectors in response to changes in environment. The method is used to model human gaze in order to calculate the gaze correction factor that will enable the local and remote participants to view each other as if they were physically present in the same physical location. The head movements (and other gestures) of all the participants are tracked and analyzed utilizing the unique ODV system to calculate the gaze correction factor, which is then used to find the exact 2D projection of the 3D object that is projected on any given display device. In practice of the invention, each participant sees a different perspective of other participants which preserves the 3D behavior of objects on a 2D display device.

The aforementioned unique device arrangement architecture of the invention includes a plurality of capture and display devices arranged in a particular pattern in the local and remote classroom environments which preserves the relative positions of the participants in the classrooms, and includes relative positions of objects and device types which together creates a tele-immersive environment for teaching/learning in the local and remote classrooms. As is illustrated and described in enabling detail further in the specification, different device arrangements are used depending on whether the classroom is a local classroom where the teacher is physically present, or a remote classroom where the teacher is not physically present and wherein a 2D projection of the teacher is displayed. Gesture recognition mechanisms trigger feed switching between video capture and display devices.

As illustrated in FIG. 1 local classroom 103 and remote classrooms 105 or 107 each have a computer/server connected to the network. Computers 125, 141 and 157 are dedicated to their respective classrooms, and comprise SW 127, 143 and 159 respectively executing thereon, which provides a computing node dedicated to recognizing physical gestures of the participants based on which a mapping node calculates a feed-display matrix for a specific interaction type, and decides the mapping between the display devices and capture devices. The mapping is decided based on a method for correcting gaze alignment in multi-point video conferencing systems using an observer dependent vector system, as is described later in enabling detail, which results in a mapping based on gaze corrected projections of the participants in all of the classrooms, local or remote.

The unique method of the invention involves functions used at the local level to model human gaze, calculate the gaze alignment and correction, tracking and analyzing head movements or other physical gestures of participants, gesture recognition, feed switching, calculation of feed-display matrix for specific interaction type. Other functionality at the global level involves master feed switching monitoring and analysis, organizing multi-party communication schemes with local service gateways and managing forwarding schedules, as will be described further in more detail in the specification. Said functionality at the local level is provided by the software executing on dedicated classroom servers 125, 141, 157, software executing on service gateways 135, 147, 163, and at the global level by software executing on Internet server 113 and on session controller 117. However, it will be apparent to one skilled in the art that said functionality either at the local or global level may be provided by the software, hardware or combination thereof, without departing from the scope of the invention.

Referring now to FIG. 1, the design of the tele-immersive environments of the present invention is based on a multi-party/multi-stream application. Each environment, i.e., local or remote classroom, has an array of cameras installed from various angles, as is further illustrated and described with respect to FIGS. 9, 10 and 11, to cover a wide field of view. Using real-time computer vision techniques, the camera array derives the 3D model of the participant represented in multiple streams with each stream corresponding to one camera. The generated and correlated video streams are exchanged with the remote tele-immersive classroom environments through the networking fabric. The 3D representations from different remote environments are merged and rendered together, creating a collaborative virtual space with the immersive awareness for every classroom participant. Such multi-stream generation, correlation, rendering and exchanging is represented simply in FIG. 1 by "streams in" and "streams out" for local classroom 103 and remote classrooms 105 and 107. Multicasting is utilized for multiple streaming.

The inventors of the present invention, through empirical research involving a series of classroom experiments and evaluation of results, have gained much understanding of what constitutes an effective e-learning environment wherein teachers and students may interact remotely with each other as though they were face-to-face in the same local classroom. The results prove that the classroom designs and software implementation of the present invention should be such that the environment experienced by both teacher and students is as close to that of a "real classroom" as possible, and that the students of a local classroom feel as though they are in the presence and sitting along with other remote classroom students in the same room, and that those of the remote classrooms feel as though the local teacher and students in the local and other remote classrooms are physically present.

During the process of empirical research, experimentation and evaluation of results, the inventors determined that to achieve such a "real classroom" immersive experience and the participants' feeling of being in the presence and sitting alongside other remote participants in the classrooms, a rendering of the remote students should be displayed on a high resolution video display alongside the local students. However, such a setup introduced problems to overcome including such as which video should be shown where and when, and the need to understand where and when switching of the video feeds should occur, and so on. It was determined by the inventors that the switching of video feeds should be based on both teacher/student interactions and student/student interactions. Such experimentation led the inventors to the design of a multi-perspective, multi-point view classroom environment providing a different viewpoint for the teacher and another coherent viewpoint to the students. It is important to note that feed switching in such environments should also include audio capture and rendering based on both teacher/student interactions and student/student interactions. Therefore, the unique design of a multi-perspective, multi-point view classroom environment providing a different viewpoint for the teacher and another coherent viewpoint to the students also includes such audio switching.

The system of names and terms used in the specification and drawings of the present application, and rules for forming these terms in this particular art of endeavor are wide and vary from relatively informal conventions of everyday speech to terms specific to the present invention. The following nomenclature provides clarification of names and terms used in the specification and drawings, and are particularly useful in the device mapping tables of FIGS. 12-14:

Classroom
The classroom is defined as the place where information flows from information sources towards information sink(s). The specification describes two types of classrooms:
  a. Local classroom
    The classroom where the primary information source (teacher/professor) is physically present. The classroom is named as LC-x where 'x' is the number pertaining to a classroom.
  b. Remote classroom
    The classroom where the primary information source is not physically present. The classroom is named as RC-x where "x" is the number pertaining to a classroom.

Teacher
  A primary information source physically present in a local classroom. The teacher is named in two parts. The first part is the physical location of the teacher and the second part is the number pertaining to the teacher. For example, the teacher in the local classroom is named "LC-1-T-x" where "x" is the number pertaining to the teacher.

Student
A primary information sink physically present in either one of the remote classrooms or the local classroom. A student who is physically present in the local classroom (LC-1) is named "LC-1-S-x" student, where "x" pertains to any number of students. Student that are physically present in the remote classroom 2 (RC-2) are named "RC-2-S-x".

Video Capture Device
A device which captures the visual information of an information source or an information sink. A device that is physically present in remote classroom 2 (RC-2) is named "RC-2-VC-x" where "VC" represents video capture and "x" is the number pertaining to the specific capture device.

Video Display Device
A device which outputs the visual information of an information source or an information sink. A device that is physically present in remote classroom 2 (RC-2) is named "RC-2-VD-x" where "VD" represents video display and "x" is the number pertaining to the specific display device.

Knowledge Objects
Objects which can take the role of an information source. For example a smart (white) board, a multimedia presentation or instructional video is considered a knowledge object. As long as an object is part of the knowledge environment, it is considered a knowledge object. For example, a smart board without informative content not a knowledge object, whereas if content is present the smartboard becomes a knowledge object.

Knowledge Environment
The sum total of all the objects which take the role of primary information source, other information source or information sink forms the knowledge environment.

The working system of the invention is basically defined as comprising three main components. These are objects, roles and modes, and each component has further attributes which are further defined as follows.

Objects are physically present in a classroom, and may refer to the teacher, a student or group of students, display or capture device, multimedia information source, information interface or channel, etc. Each object has a location defined by a set of coordinates to define its position, which may be x, y, z coordinates. Each object also has a direction wherein a vector defines the direction in which the object is oriented with respect to the origin. A set of vectors are defined and used to represent the system as shown and described further with respect to FIGS. 3-8 later in the specification. The direction of the object defines the direction in which the object is facing. Each object also has a plane that defines its "face", and a media type such as video, audio, text or multimedia.

Roles are a second main component of the system. Every object in the system is classified to take on one of a list of specific roles. A primary information source is one such role held by a teacher/professor, therefore the teacher object is considered a major source of primary information. A classroom lecture environment is an example of the teacher object taking the role of primary information source. Other objects in the system may take a role of information source, such as whiteboard/smartboard, or multimedia presentations or instructional video, etc. Students in discussion with the teacher or with other students may also take on the role of information source. Objects that receive information, such as a listening student take on the role of information sink. Between every information source and sink there is an information channel role, and an interface object between the information source and channel takes a role termed "tap-in", while an interface object between information channel and sink takes a role termed "tap-out".

Modes in a classroom environment are a third main system component category. The terms "modes" are "states" are used interchangeably in the specification. There are three basic states in the system, those being instruction mode, interaction mode and discussion mode. Instruction mode is when the teacher object takes the role of primary information source and the student objects take the role of information sink. In instruction mode the teacher is lecturing generally in a local classroom, students are in the local classroom and the teacher is not interacting with any classroom of students specifically. The local classroom teacher and students in this mode face each other in a generally natural setting, and the students therefore see the teacher directly. It is important to note that the system is assumed to be in the instruction mode at the start of the class, which is therefore the initiation of the instruction mode or state.

Interaction mode is when the teacher object directs information to a particular student object or set of same i.e., the teacher is interacting with a specific classroom of students. The Interaction mode is initiated for example, when the teacher wishes to interact with a specific classroom and invokes a physical gesture such as head nodding, finger pointing or some other hand or arm gesture or the like. The system recognizes this gesture utilizing a gesture recognition mechanism and automatically switches to the interaction state.

Discussion mode is when the teacher object and student objects take the role of both information source and information sink. For example, in discussion mode the local teacher and students from any of the classrooms local or remote, are enabled to interact with one another. In this mode, teacher may initiate interaction with any local or remote students, any student may initiate interaction with teacher and students may initiate interaction with other students whether locally or remotely. Such interaction initiation may include physical gestures by teacher or student such as pointing or some other physical gesture which triggers the system to enter the discussion mode.

It is important to note that the system can be in only one mode or "state" at any given time. For example, the system cannot be in an interaction state wherein the local teacher is interacting with one of the remote classrooms, and another remote classroom is at the same time interacting with students in the local classroom. In order for accurate and effective switching and pairing of capture to display devices to occur, the system state at any given time must be unique and specific. Further, there must be a system-wide recognizable trigger for switching the system from one state to another. More specific details on gesture recognition, switching and pairing are discussed further in the specification with respect to the unique classroom designs of FIGS. 9-11, and feed switching tables of FIGS. 12-14.

As discussed with reference to main components of the working system of the invention, object roles are one of the three main system components, the others being objects and object modes or "states". Every object in the system is classified to take on one of a plurality of roles, those being primary information source, other information source, information sink, information tap-in, information tap-out and information channel.

Figure 2:
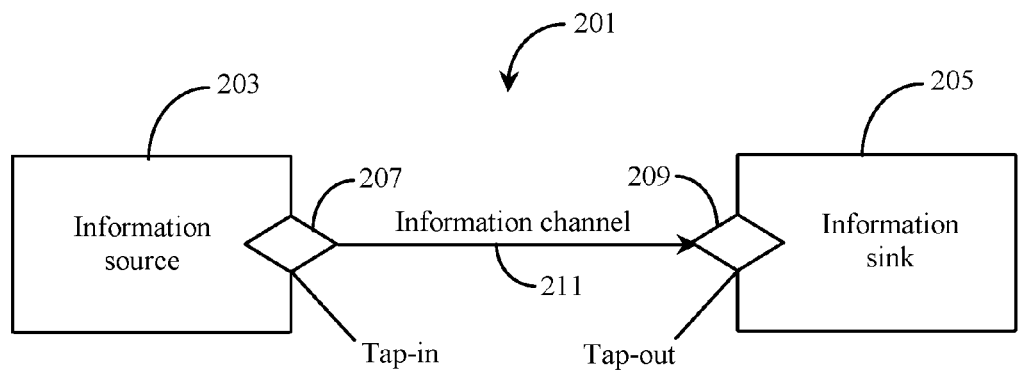
FIG. 2 is a block diagram illustrating object role classification according to an embodiment of the invention.

FIG. 2 is a simple block diagram illustrating object role classification according to an embodiment of the invention. Role classification 201 includes an information source 203 which may be a primary information source such as a teacher object at stand in a classroom, another information source which may be a multimedia instructional video or slide presentation, a whiteboard or "smart" board, or can even be a student object in discussion with a teacher object or other students in a local or remote classroom. Information sink 205 represents an object in the classroom which receives information provided by information source 203. A student object is a primary example of an information sink. However, either the teacher or student object may take the role of information sink, depending on which mode or "state" the system is currently in.

Element 207 labeled "Tap-in" represents an object of the system which is classified as an interface between the information source and information channel 211. Interface 207 may be a generic hardware or software implementation on the information source side, and may generate executable code from data provided by the information source, such that the data may be transmitted through information channel 211 and utilized by information sink 205. On the side of information sink, an interface 209 is provided, labeled as "Tap-out". Interface 209 may also be a generic hardware or software implementation on the information sink side, and may generate executable code from data transmitted through information channel 211 such that it may be utilized by information sink 205. Information channel 211 is an object classified for taking on the role of carrying information from interface 207 on the source side to interface 209 on the sink side. Channel 211 is a data pathway which may represent a physical transmission medium or may be a logical connection over a multiplexed transmission medium, and is used to convey the information signals from one or several information source interfaces 207 to one or several information sink interfaces 209.

The object of the present invention is to provide a system and method for synthesizing and preserving consistent relative neighborhood position in multi-perspective multi-point tele-immersive environments, such as e-learning local and remote classrooms. The invention includes a method for correcting eye gaze alignment in multipoint video conferencing systems using an observer dependent vector (ODV) system as well as video and audio capture and display/render device arrangement architecture for the local and remote environments which maintains relative neighborhood positions of all of the e-learning participants. The unique ODV system utilized by the aforementioned gaze correction method calculates the gaze correction factor before transforming the 3D objects into 2D projection space. This includes using a coordinate system for defining the objects in a 3D environment, a set of vector definitions and the specific behavior of certain vectors to changes in environment.

Figure 3:
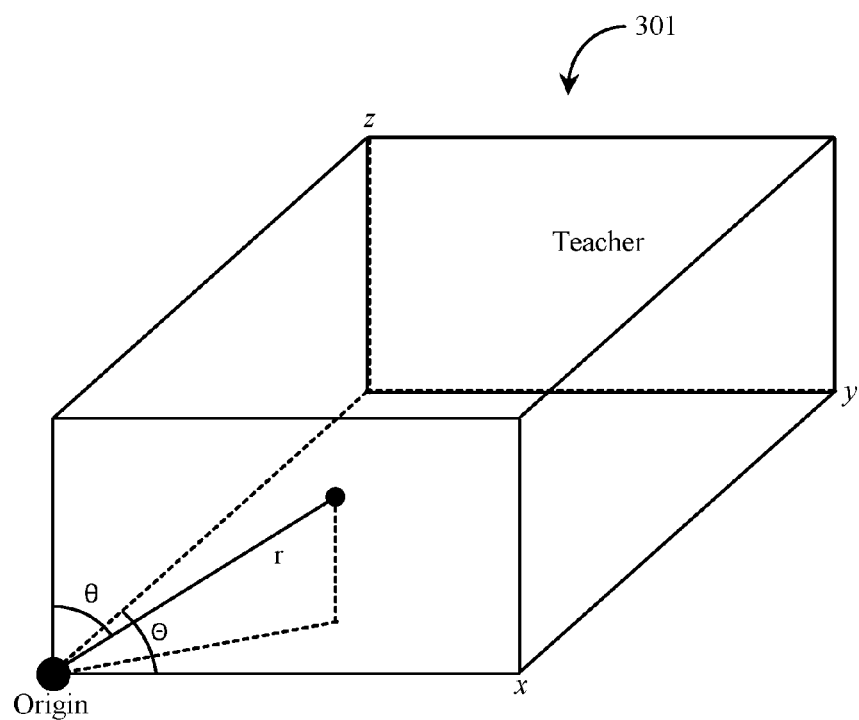
FIG. 3 illustrates a coordinate system for gaze correction and object location in a tele-immersive environment according to an embodiment of the invention.

FIG. 3 illustrates such a coordinate system for gaze correction and locating classroom objects in a tele-immersive environment according to an embodiment of the invention. System 301 is a simple representation of a spherical coordinate system for 3D space which is defined to locate the objects in the classroom environment, and is a system local to all classrooms either local or remote, and is defined for each of the classrooms. As shown in the diagram the origin of the coordinate system is defined as the left bottom corner of the intersection of the walls opposite to where the teacher object is physically or virtually present. Any other definition of origin would also suffice; however, for simplicity and uniformity the corner point as shown is standardized. The radial distance from origin to point, polar and azimuth angles are measured as is known in the art in order to place the (real) local and (real) remote classrooms and their objects into a virtual global space.

Vectors, which can be considered course, direction or guidance, are incorporated in the design of the invention, and the inventors have defined a unique set of vectors to represent the system. All of these vectors exist in the spherical coordinate system of FIG. 3. Three different vectors are defined for the objects in the classroom. These are object vector, observer vector and observer dependent vector (ODV). The main object of the present invention is to provide a system and method for synthesizing and preserving consistent relative neighborhood positions of objects in multi-perspective multi-point tele-immersive environments such as the local and remote classrooms described heretofore. The system provides time varying perspectives for different classroom participants according to the type of interaction in which they are involved.

The synthesizing of consistent relative neighborhood of participants is achieved using vector analysis of participant positions coupled with a gesture recognition system for creating a tele-immersive environment. The local and each remote location are provided with a plurality capturing and rendering devices arranged in a predetermined pattern and directed at the participants. Each location has a dedicated computing node which computes observer dependent vector (ODV) using inputs from the capture devices, and a set of ODVs so computed is used to calculate the gaze correction factor. At least one mapping node combined with the gesture recognition system classifies the gestures and triggers mapping of the capture devices of one remote location to the display devices of another remote location.

Objects are physically present in a classroom, and may refer to the teacher, a student or group of students, display or capture device, multimedia information source, information interface or channel, etc. Each object has a location defined by a set of coordinates to define its position, which may be x, y, z coordinates. Each object also has a direction wherein a vector defines the direction in which the object is oriented with respect to the origin. The direction of the object defines the direction in which the object is facing. Each object also has a plane that defines its "face", and a media type such as video, audio, text or multimedia.

Figure 4:
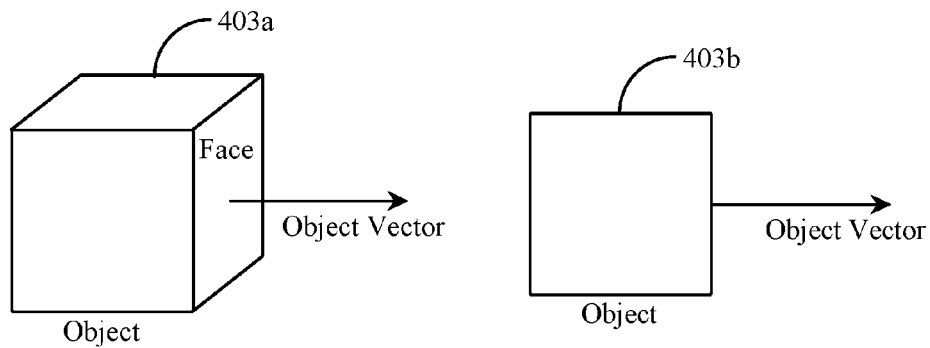
FIG. 4 illustrates object vector origination according to an embodiment of the invention.

FIG. 4 illustrates object vector origination according to an embodiment of the invention. The object vector is one of three different aforementioned vectors defined by the inventors for the objects in the classroom. Object 403a as illustrated is a three dimensional object which could represent any 3D object physically present in a classroom. The teacher and student or group of students can be considered 3D objects. Object 403a has a plane that defines its "face", and an object vector as defined by the inventors originates from this plane and is directed normally outward from the face and perpendicular to the face. 403b illustrates the top view of object 403a.

The observer vector is another of the unique set of three vectors defined by the inventors and used to represent the system of the invention, and also exists in the spherical coordinate system of FIG. 3. The observer vector, as with object vectors, originates from the plane or "face" of an object and is always directed towards an object vector.

Figure 5:
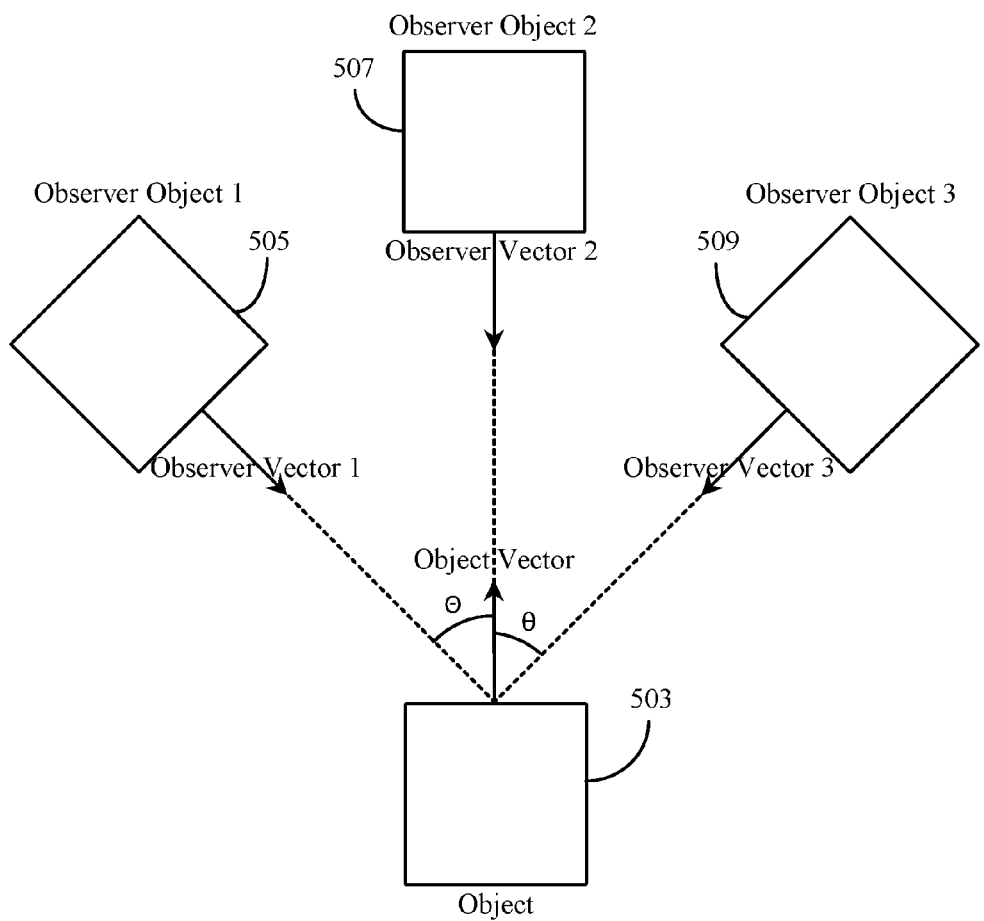
FIG. 5 illustrates observer and object vector origination according to an embodiment of the invention.

FIG. 5 illustrates observer and object vector origination according to an embodiment of the invention. Illustrated are three different observer object s "looking" at one object 503 along their respective observer vectors. Observer object 505 is a first object, 507 a second and 509 a third. Observer objects 505, 507 and 509 may be considered observing student objects or video capture devices in a classroom. Object 503 may be considered the teacher object at stand in the front and center of a classroom, or a display device in either a local or remote classroom.

As illustrated, observer object 507 is collinear and opposite to object 503. Object 507 has an observer vector 2 originating outwardly from its "face" plane and directed collinearly towards object vector originating from the face of object 503. Observer vector 2 is collinear and opposite with object vector of 503 illustrating that their "eyes" meet. Observer vectors 1 and 3 originating from objects 505 and 509 respectively, obtain a side view of the face of object 503, at angles indicated in the illustration by the symbols θ and Θ.

Figure 6:
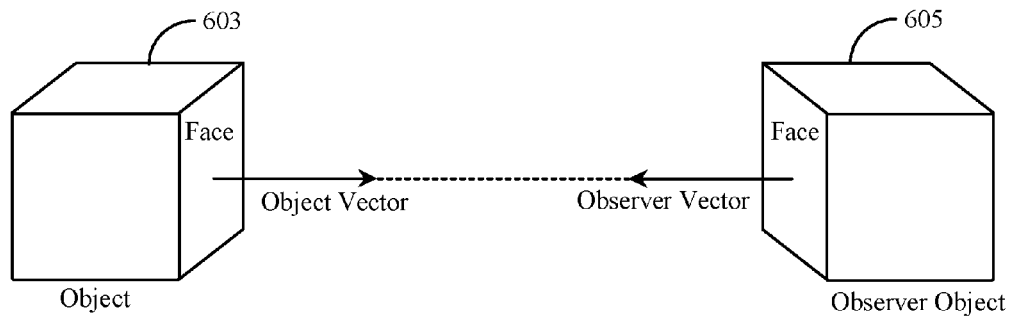
FIG. 6 illustrates collinear object and observer vector origination according to an embodiment of the invention.

FIG. 6 illustrates collinear object and observer vector origination according to an embodiment of the invention. In this simple representation which is a specific case where the object vector and the observer vector are collinear and opposite in direction, object 603 is a 3D object which could represent a teacher object in a virtual classroom. Observer object 605 is also a 3D object and could represent an observing student object or group thereof in a virtual classroom. The object vector originates from the face of object 603, the observer vector originates from the face of observer object 605, and both vectors are direct toward each other oppositely and collinearly.

The observer dependent vector (ODV) is another of the unique set of three vectors defined by the inventors and used to represent the system of the invention, and also exists in the spherical coordinate system of FIG. 3. Every object on a 2D display plane is associated with an ODV, and the ODV exists only when it is observed. For example, when the observer vector is not directed towards the origin of the ODV, the ODV ceases to exist. This convention is simply illustrated by FIGS. 7a and 7b.

Figure 7A:
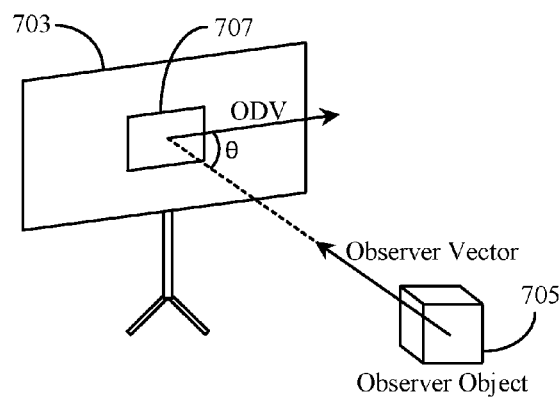
FIG. 7a illustrates displayed object viewing according to an embodiment of the invention.

FIG. 7a illustrates displayed object viewing according to an embodiment of the invention, wherein display device 703 displays on a 2D screen, an object 707 for viewing by observer object 705 along its observer vector originating therefrom. The observer vector creates an angle with the ODV indicated by the symbol Θ. Every object on a 2D display plane such as object 707 of display 703 is associated with an ODV, and the ODV exists only when it is observed, and ceases to exist when the observer vector is not directed towards the ODV origin. This convention is simply illustrated by FIG. 7b.

Figure 7B:
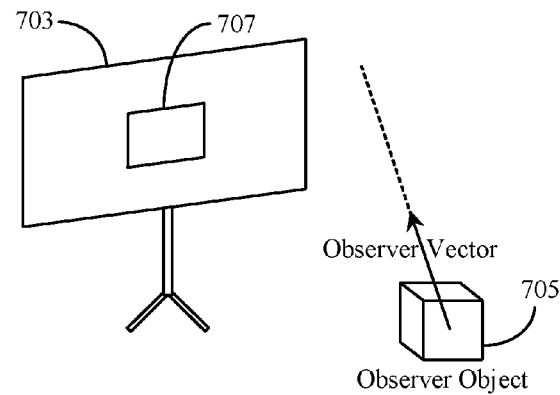
FIG. 7b illustrates displayed object viewing according to another embodiment of the invention.

FIG. 7b illustrates displayed object viewing wherein the observer vector is not directed towards the origin of the ODV. As shown, display 703 has a 2D display plane depicting object 707. The observer vector originating from observer object 705 is directed away from the displayed object 707 causing the ODV to cease to exist. The ODV exists only when it is observed, the direction of the ODV is determined by the direction of the observer vector, so when the position of the observer vector changes, the direction of the ODV also changes such that the angle between them in preserved. This ODV angle preservation is simply illustrated in FIGS. 8a-c.

Figure 8A:
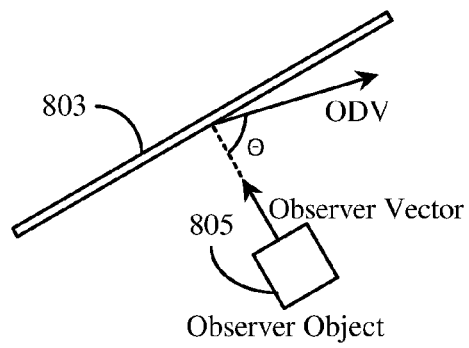
FIG. 8a illustrates an observer dependent vector angle according to an embodiment of the invention.

FIG. 8a illustrates an observer dependent vector angle according to an embodiment of the invention. Display device 803 has a 2D display plane and is analogous to display device 703 of FIGS. 7a, b, as well as observer object 805 which is analogous to observer object 705 of FIGS. 7a, b. As shown an observer vector originates from observer object 805 and is directed perpendicularly to the face of display 803, creating an angle with the ODV labeled with the symbol θ.

Figure 8B:
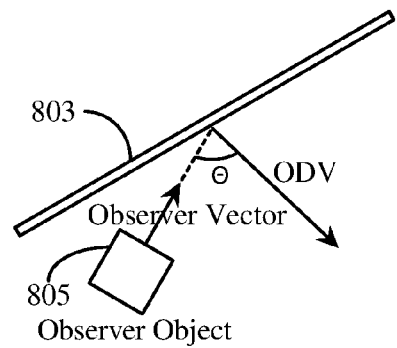
FIG. 8b illustrates an observer dependent vector angle according to another embodiment of the invention.

FIG. 8b illustrates display 803 and observer object 805 of FIG. 8a. The observer vector originates from observer object 805 and is directed to the face of display 803 as in FIG. 8a. However, in this illustration as shown observer object 803 is not facing display 803 perpendicularly, and therefore the observer vector originating from object 805 is directed towards the face of display 803 at an angle other than perpendicular. However, the angle created with the ODV remains preserved, having the same value as that of the angle created by the observer vector and ODV of FIG. 8a, and is similarly labeled with the symbol θ. As is clear, the angle between the observer vector and the ODV remains conserved when the observer object moves, hence the term observer dependent vector.

For human objects, the observer vector is an approximation of "gaze cone". A gaze cone as termed by the inventors is defined in the system as a collection of vectors emanating from the eyes of the human observer forming a "cone" of sorts. Referring now to the observer objects of FIG. 5 as an example, if first observer object 1 (505) is a human object such as a student and is observing a second human object (503), the first object is not able to identify the exact point at which the second object is "looking" at. This is true in both cases of where the second object is real or virtual. Thus, the gaze is directed towards a region rather that one single point. The aforementioned "gaze cone" is illustrated in FIG. 8c.

Figure 8C:
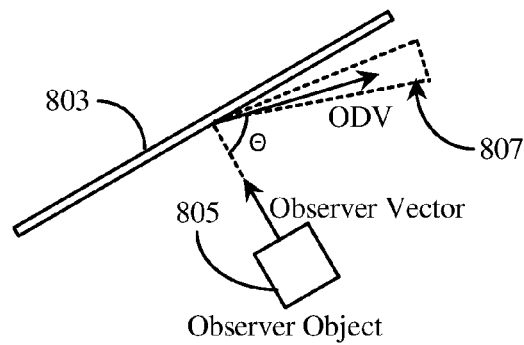
FIG. 8c illustrates an observer dependent vector angle and gaze cone according to an embodiment of the invention.

FIG. 8c illustrates an observer dependent vector angle and gaze cone according to an embodiment of the invention. Display 803 and observer object 805 with observer vector originating from observer object 805, the vector directed perpendicularly to the face of display 803 as in FIG. 8a. The angle created between the observer vector and ODV is preserved and indicated by symbol θ. A gaze cone 807 is shown directed to a region rather than a particular point. The gaze cone is defined in the system as a collection of vectors. This approximation simplifies the calculations and has no significant influence on the results.

The primary object of the present invention is to bring virtual objects into real physical environments and have them behave as if the virtual objects were real objects. The classroom participants' sense of tele-immersion is enhanced by the unique classroom arrangement of video and audio capture devices and display/render devices, coupled with a system of gaze correction, gesture recognition and intelligent device switching and capture/render device mapping, creating an immersive environment experienced by the classroom participants as if the teacher in a local classroom and the students in the local classroom as well as one or more remote classrooms were all in the same room interacting face-to-face. Such immersive interaction may be between teacher and student or between students, either local or remote.

The system generally includes a plurality of video cameras arranged in particular patterns including gesture recognition mechanisms and trigger-based camera feed switching. An array of cameras is arranged in particular patterns in a classroom depending on whether the classroom is local or remote, wherein an array is directed to a local or remote classroom of students and another array is directed to a teacher at stand in a local classroom. The system also includes a plurality of large video displays in the local and remote classrooms which render the video feed captured by the camera arrays. Groupings of the video capture and display devices may be construed as capture and display "stations".

A real object is physically present in an environment and a virtual object is only a projection of the object which could be physically present in some other geographical location or virtual location. The following FIGS. 9-11 illustrate the unique classroom designs which address the challenges associated with giving virtual objects real behavior, one of which is generally a three dimensional (3D) object projected on a two dimensional (2D) display.

One example of this challenge is that, suppose a first and second object, one of which could be a teacher and another a group of observing students, are physically present in a real (non-virtual) classroom environment and the observer vectors of the first and second objects create a vector angle A. When the first object wishes to view the second object from another angle, the first object must change its angular displacement by an angle B such that the first object "sees" the second object at the desired angle. In another instance, suppose that a first object is physically present and a second object is not physically present but a 2D virtual projection. According to the aforementioned ODV (see FIGS. 8a-c) a first observer vector creates a first angle with the ODV of the second object. If the second object then makes a displacement with respect to its initial position, the angle between the ODV and the first observer vector remains angle A, which is not the behavior of an object that is physically present.

Challenges also exist in multipoint classroom participation (MCP) environments wherein students from geographically separate locations come together in a mixed environment where both physical and virtually represented students are present. In such an environment the teacher and students at different classrooms become real or virtual objects depending on which classroom in which they are present, whether local or remote. The aforementioned problem of 3D to 2D projection is again introduced, where the projection of the students or the teacher on a 2D display can have their ODV aligned with the observer vector of the real (non-virtual) objects in an undesired angle.

For example, suppose there are a first and second remote classroom and one local classroom in an MCP session, wherein the teacher is physically present in the local classroom. In a discussion mode, a student in the first remote classroom interacts with a student in the second remote classroom. When other students in the local classroom view a projection of the remote classrooms, it is desired that the local students have the feeling that the students in discussion between the first and second remote classrooms are "looking" at each other. Such natural behavior, as if the first and second remote students were physically present in the same classroom, is the desired effect. As another example, when the teacher is in instruction mode in the local classroom, it is desirable that the teacher views the remote students as if they were sitting before, and facing him or her in the same classroom. While simultaneously, it is desirable that the local students view the remote classroom students who are projected on a 2D surface display, also facing the teacher, i.e., a side view of the students.

The system of the invention overcomes the aforementioned challenges by employing multiple visual and audio capture devices and intelligently switching between them in order to align the ODV with the observer vector, thus creating the desired view angles. The following FIGS. 9-11 illustrate and describe the unique classroom design situations and switching algorithm based on ODV and observer vector alignment, which address the above challenges and produces the desired effects. The system of the invention is simplified into an MCP environment comprising a local classroom and a first and second remote classroom. The various objects present in each of the classrooms are specified and described in enabling detail.

FIG. 9 is a block diagram illustrating one such classroom design in a local e-learning MCP tele-immersive environment according to an embodiment of the invention. Classroom 901 in this embodiment is a local classroom analogous to local classroom 103 of FIG. 1, and in practice of the invention is part of the MCP scenario which includes remote classrooms subsequently illustrated and described. FIG. 9 illustrates an arrangement of a plurality of video capture and display devices, arranged in a particular pattern which preserves the relative positions of the participants in the classroom. It includes relative positions of objects and device types which together with capture and feed from remote classrooms create tele-immersive e-learning environments for both local and remote classrooms.

Classroom 901 is an arrangement for a local classroom where the teacher is physically present. The classroom setup generally includes a teacher, a plurality of students, an array of cameras directed to the teacher, and another array of cameras directed to the students in the classroom. The teacher or faculty to where the camera array is directed may be considered and termed "station", as may the students to where camera arrays are directed. The cameras are adjusted to capture the video and audio feed of the teacher and student classroom participants, and the cameras of each array are positioned in a specific order so as to selectively capture the different viewpoints of the station participants. Each camera of each array has a capture node connected to the network that captures the source feed and transmits the data to another remote node across the network.

The system also includes a first plurality of large video display devices which render the video feeds from the cameras of the array making the rendered objects viewable to the teacher and students, and a second plurality of large displays which may render images or video from other sources such as instructional multimedia or slide presentations or the like. The displays are connected to several display nodes which are in turn connected to the network backbone. The displays of the first plurality of displays are positioned in a specific order and selectively display the feeds provided by the capture nodes of the cameras. The displays in local classroom 901 may be categorized in two types. One type is a teacher-side display array, meaning that they are viewable by the teacher, and the other is a student-side display array viewable by the students. Both the teacher-side and student-side set of display show the remote classroom students facing the professor. The displays are differentiated by different camera feeds coming to the display sets in order to provide the correct view to the teacher as well as the students in the local classroom. An array of audio output devices (not shown) are aligned with the plurality of display devices, providing audio playback which ensures spatial synchronization of audio and video from the display device; i.e. the audio of a particular classroom comes from the direction of the display device displaying that particular classroom. In a preferred embodiment audio input devices are employed locally to each classroom participant or in other embodiments may be such as a microphone worn by each MCP participant including the teacher, as a lapel microphone for example. The audio input devices would provide audio feeds switched to audio outputs associated with each display device, such that a participant viewing a display of another participant would hear the displayed participant from the direction of the participant display.

In the system terminology, all interacting components whether human or device, local or remote are considered and termed objects. The inventors have incorporated a naming convention for identifying said objects. Said naming convention is particularly useful in understanding the device mapping tables as provided in FIGS. 12-14. The object naming structure begins with classroom identification, followed by classroom number, followed by object identifier, followed by object number. The interacting objects are labeled as such in FIG. 9. The naming convention is as follows:

T=Teacher
S=Students
LC=Local Classroom
VC=Video Camera
VD=Video Display

For example, camera 919 of FIG. 9 is labeled LC-1-VC-1, meaning local classroom (LC)-classroom number one (1)-video camera (VC)-device or object number one (1).

In the unique classroom design illustrated, three different video cameras are directed to teacher 903 at different angles which capture the viewpoints of the teacher. In this tele-teaching application teacher 903 is defined as the primary information source. Cameras 919 and 921 are directed to teacher 903 at 45 degrees on either side, while camera 929 is directed to teacher 903 directly from the front and facing teacher 903, perpendicularly of the teacher's forward-facing direction. Five video cameras are directed to students 935 at different angles which capture the different viewpoints of the student participants. In this tele-teaching application students 935, as well as remote classroom student participants, are defined as primary information sinks. Cameras 925 and 927 are directed to students 935 at a 45 degree angle on either side, camera 923 is directed to the students directly from the front and facing the students perpendicularly to the students' forward-facing direction, while cameras 931 and 933 are directed to the students from either side at 90 degrees of their forward-facing direction, capturing each side view of the student station. The angles and arrangement of the cameras directed to teacher 903 and students 935 is an important factor which will become apparent as this embodiment of the invention is further detailed in the specification.

Video displays 911, 913, 915 and 917 are arranged such that video feeds from the remote classrooms may be rendered and viewable by both teacher 903 and students 935. Displays 911 and 913 are directed for viewing by teacher 903; display 911 for rendering the display of students in a first remote classroom and display 913 for rendering the display of students in a second remote classroom. Displays 915 and 917 are directed for viewing by students 935; display 915 for rendering the display of students in a first remote classroom and display 917 for rendering the display of students in a second remote classroom. Classroom 901 also includes a whiteboard 905, which may be a standard writeable board or in a preferred embodiment a video display "smartboard" for projecting a 2D image of the teacher, and a pair of video presentation screens 907 and 909 which may be used for displaying multimedia instructional or informative content such as video or slide presentations. It is noted that whiteboard 905 and presentation screens 907, 909 used in the arrangement shown in this figure are at least supplementary devices to the teaching faculty and not necessarily components required in classroom 901 for practicing the invention.

Although not shown in this figure it can be assumed, as shown in the system architecture described with reference to FIG. 1 and classrooms 103, 105 and 107, that all of the video/audio capture and display/render devices of classroom 901 are interconnected via a local area network (LAN) which in a preferred embodiment is a high-speed LAN, and which may be a wireless network or any other suitable high-speed digital connection network. As is also described with reference to the classrooms of FIG. 1 but not shown in FIG. 9, classroom 901 has at least one dedicated server implemented therein, such as server 125 of classroom 103, as well as a service gateway such as gateway 135 of classroom 103.

The at least one dedicated server executes software for gesture recognition and analysis, capture and feed switching based on same, and capture/display device node pairing and mapping. Such functionality and its application in practice of the present invention are further described subsequently in the specification in enabling detail. It can be assumed that the dedicated server and service gateway are interconnected to the camera and display devices via the LAN of classroom 901, and the service gateway connects to a digital wide-area-network (WAN) such as the Internet network via a global network backbone which represents all of the lines, equipment, access points and packet-routing capability that make up the Internet as a whole. The global network line connected to the local gateway of classroom 901 serves as a carrier network for interconnectivity between the local and other remote classrooms.

Session architecture is based on an end-system overlay network with two hierarchical levels which are a local level and a global level. At the local level, multipoint communication and multicasting with remote classrooms via the global network is managed by the service gateway which consists of one or more processors and software as described for classroom 103, FIG. 1. The local service gateway registers with a central session controller such as 117 of FIG. 1 at the Internet level via a global network backbone connection. The central session controller has software 119 executing thereon providing functionality for organizing the multi-party multi-point communications.

The system of the invention is simplified into an MCP environment comprising a local classroom, the general configuration of which was described above with reference to FIG. 9, and a first and second remote classroom. The remote classrooms are geographically separated from the local classroom, but are interconnected and communicate with the local classroom via a global network (WAN) such as the Internet.

FIG. 10 is a block diagram illustrating one such remote classroom design in the e-learning MCP tele-immersive environment according to an embodiment of the invention. Classroom 1001 in this embodiment is a first remote classroom analogous to remote classroom 105 of FIG. 1, and is labeled "Remote Classroom #1". In practice of the invention classroom 1001 is part of the MCP scenario which includes a local classroom as in classroom 901 of FIG. 9, and a second remote classroom subsequently illustrated and described in FIG. 11. A plurality of video capture and display devices are arranged in a particular pattern which preserves the relative positions of the student participants in the MCP environment. It includes relative positions of objects and device types which together with capture and feed from the local and other remote classroom create tele-immersive e-learning environments for both local and remote classroom participants.

Classroom 1001 is an arrangement for a remote classroom where the teacher is not physically present. The classroom setup generally includes a plurality of students at the rear center of the classroom, an array of cameras directed to the students and a plurality of large video display devices. The displays in remote classroom 1001 may be categorized in two different sets; a frontal set which renders a display of the local teacher of classroom 901, FIG. 9, as well as images or video from other sources such as instructional multimedia or slide presentations or the like and a second surrounding set of displays which renders the video feeds from the cameras of remote classrooms displaying the students of the local and other remote classroom. The cameras are adjusted to capture the video and audio feed of the student classroom participants, and the cameras of each array are positioned in a specific order so as to selectively capture the different viewpoints of the student station participants. As in classroom 901 of FIG. 9, each camera has a capture node connected to the network that captures the source feed and transmits the data to other remote nodes across the network. The displays of the first plurality of displays are positioned in a specific order and selectively display the feeds provided by the capture nodes of the cameras, both local and remote. Also as in local classroom 901 of FIG. 9, the displays are connected to display nodes which are in turn connected to the network backbone. An array of audio output devices (not shown) are aligned with the plurality of display devices, providing audio playback which ensures spatial synchronization of audio and video from the display device; i.e. the audio of a particular classroom comes from the direction of the display device displaying that particular classroom. In a preferred embodiment audio input devices are employed local to each classroom participant or in other embodiments may be such as a microphone worn by each MCP participant including the teacher, as a lapel microphone for example. The audio input devices would provide audio feeds switched to audio outputs associated with each display device, such that a participant viewing a display of another participant would hear the displayed participant from the direction of the participant display.

The naming convention for identifying the objects (human and device) of classroom 1001 is incorporated herein as in FIG. 9, and is particularly useful in understanding the device mapping tables as provided in FIGS. 12-14. The naming convention as applied to FIG. 10 is as follows:
S=Students
RC=Remote Classroom
VC=Video Camera
VD=Video Display For example, camera 1015 of FIG. 10 is labeled RC-1-VC-2, meaning remote classroom (RC)-classroom number one (1)-video camera (VC)-device or object number two (2).

In the classroom design illustrated, five different video cameras are directed to students 1023 at different angles which capture the different viewpoints of the students. In this tele-teaching application students 1023, as well as other remote or local classroom student participants, are defined as primary information sinks. Cameras 1015 and 1017 are directed to students 1023 at a 45 degree angle on either side, camera 1013 is directed to the students directly from the front and facing the students perpendicularly to the students' forward-facing direction, while cameras 1019 and 1021 are directed to the students from either side at 90 degrees of their forward-facing direction, capturing each side view of the student station. The angles and arrangement of the cameras directed to students 1023 is an important factor which will be apparent as this classroom configuration, and how it relates to other classroom configurations in practice of the MCP tele-immersive system of the invention is further detailed in the specification.

Video displays 1009, and 1011 are arranged such that video feeds from both the local classroom and remote classrooms may be rendered and viewable by students 1023, and are directed for viewing by students 1023; display 1009 for rendering the display of students in the local classroom 901, FIG. 9, and display 1011 for rendering the display of students in a second remote classroom. Classroom 1001 also includes a display 1005, which is a large, preferably flat panel video display, and a pair of video presentation screens 1003 and 1007 which may be used for displaying multimedia instructional or informative content such as video or slide presentations. It is noted that presentation screens 1003 and 1007 in the arrangement shown in this figure at least are supplementary devices to the teaching faculty and not necessarily required components in practice of the invention. However, since classroom 1001 is a remote classroom where the teacher (local teacher 903, FIG. 9) is not physically present, the primary purpose of display 1005 is rendering a 2D representation of local teacher at stand in the local classroom (teacher 903, FIG. 9) viewable by students 1023 as if the teacher were at stand in the front and center of their remote classroom. Display 1005 may also display other content presented in whiteboard (WB) 905 of FIG. 9.

Although not shown in this figure it can be assumed, as described with reference to local classroom 901 of FIG. 9, that all of the video/audio capture and display/render devices of classroom 1001 are interconnected via a local area network (LAN), and classroom 1001 has at least one dedicated server implemented therein, as well as a service gateway. The dedicated server executes software for gesture recognition and analysis, capture and feed switching based on same, and capture/display device node pairing and mapping. It can also be assumed that the dedicated server and service gateway are interconnected to the camera and display devices via the LAN of classroom 1001, and the service gateway connects to a digital wide-area-network (WAN) as in FIG. 9.

The system of the invention is simplified into an MCP environment comprising a local classroom and a first and second remote classroom. The general configurations of the local and first remote classrooms are described above with reference to FIGS. 9 and 10 respectively. As previously described the remote classrooms are geographically separated from the local classroom, but are interconnected and communicate with the local classroom via a global network (WAN) such as the Internet.

FIG. 11 is a block diagram illustrating a second remote classroom design in the e-learning MCP tele-immersive environment according to an embodiment of the invention. Classroom 1101 in this embodiment is a second remote classroom analogous to remote classroom 107 of FIG. 1, and is labeled "Remote Classroom #2". In practice of the invention classroom 1101 is part of the MCP scenario which includes a local classroom as in classroom 901 of FIG. 9, and a first remote classroom as in classroom 1001 of FIG. 10. Classroom 1101 is configured similarly to classroom 1001 of FIG. 10, having a plurality of video capture and display devices arranged in a particular pattern which preserves the relative positions of the student participants in the MCP environment. It includes relative positions of objects and device types which together with capture and feed from the local and other remote classroom create tele-immersive e-learning environments for both local and remote classroom participants.

Classroom 1101 is a similar arrangement to remote classroom 1001 of FIG. 10 where the teacher is also not physically present. The classroom setup is nearly identical in composition to that of first remote classroom 1001, each camera also having a video and audio capture node connected to the network that captures the source feed and transmits the data to other remote nodes across the network. The displays of a first plurality are positioned in a specific order and selectively display the feeds provided by the capture nodes of the cameras of the local classroom 901 and remote classroom 1001. As in remote classroom 1001 of FIG. 10, classroom 1101 generally includes a plurality of students at the rear center of the classroom, an array of cameras directed to the students and a plurality of large video display devices. The displays in remote classroom 1101 may be categorized in two different sets; a frontal set which renders a display of the local teacher of local classroom 901, FIG. 9, as well as images or video from other sources such as instructional multimedia or slide presentations or the like and a second surrounding set of displays which renders the video feeds from the cameras of remote classrooms displaying the students of the local and other remote classroom. The cameras are adjusted to capture the video and audio feed of the student classroom participants, and the cameras of each array are positioned in a specific order so as to selectively capture the different viewpoints of the student station participants. As in local classroom 901 and the other remote classroom 1001, each camera in classroom 1101 has a capture node connected to the network that captures the source feed and transmits the data to other remote nodes across the network. The displays of the first plurality of displays are positioned in a specific order and selectively display the feeds provided by the capture nodes of the cameras, both local and remote. Also as in the local and other remote classroom, the displays are connected to display nodes which are in turn connected to the network backbone. An array of audio output devices (not shown) are aligned with the plurality of display devices, providing audio playback which ensures spatial synchronization of audio and video from the display device; i.e. the audio of a particular classroom comes from the direction of the display device displaying that particular classroom. In a preferred embodiment audio input devices are employed local to each classroom participant or in other embodiments may be such as a microphone worn by each MCP participant including the teacher, as a lapel microphone for example. The audio input devices would provide audio feeds switched to audio outputs associated with each display device, such that a participant viewing a display of another participant would hear the displayed participant from the direction of the participant display. The naming convention for identifying the objects (human and device) of classroom 1101 is the same as for the local and first remote classrooms.

In the classroom design illustrated, five different video cameras are directed to students 1123 at different angles which capture the different viewpoints of the students. In this tele-teaching application students 1123, as well as other remote or local classroom student participants, are defined as primary information sinks. Cameras 1115 and 1117 are directed to students 1123 at a 45 degree angle on either side, camera 1113 is directed to the students directly from the front and facing the students perpendicularly to the students' forward-facing direction, while cameras 1119 and 1121 are directed to the students from either side at 90 degrees of their forward-facing direction, capturing each side view of the student station. As with the local and first remote classrooms, the angles and arrangement of the cameras directed to students 1123 is an important factor which will become apparent as this classroom configuration, and how it relates to other classroom configurations in practice of the MCP tele-immersive system of the invention is further detailed in the specification.

Video displays 1109, and 1111 are arranged such that video feeds from both the local classroom and remote classrooms may be rendered and viewable by students 1023, and are directed for viewing by students 1123; display 1109 for rendering the display of students in the first remote classroom 1001 of FIG. 10, and display 1111 for rendering the display of students in the local classroom 901, FIG. 9. Classroom 1101 also includes a main display 1105 and a pair of supplementary video presentation screens 1103 and 1107 which are similar to those of the first remote classroom. The supplementary displays are primarily used for displaying multimedia instructional or informative content such as video or slide presentations, thus not necessarily required components in practice of the invention. However, since classroom 1101 is a remote classroom where the teacher (local teacher 903, FIG. 9) is not physically present, the primary purpose of display 1105 is rendering a 2D representation of local teacher (teacher 903, FIG. 9) at stand in the local classroom, and viewable by students 1123 as if the teacher were at stand in the front and center of their own remote classroom. Display 1105 may also display the contents presented in whiteboard (WB) 905 of FIG. 9.

Although not shown in this figure it can be assumed, as described with reference to classrooms 901 and 1001, that all of the video/audio capture and display/render devices of classroom 1101 are similarly interconnected via LAN, and there is at least one dedicated server, as well as a service gateway. The dedicated server executes software for gesture recognition and analysis, capture and feed switching based on same, and capture/display device node pairing and mapping. It can also be assumed that the dedicated server and service gateway are interconnected to the camera and display devices via the LAN of classroom 1001, and the service gateway connects to a digital wide-area-network (WAN) as in FIGS. 9 and 10.

Each of the objects (teacher, students, capture and render devices) illustrated in local classroom 901 of FIG. 9 and remote classrooms 1001 and 1201 of FIGS. 10 and 11 respectively, have a corresponding object vector associated with them. Whenever an object is observing another object, the object transforms itself into an observer vector. Further, any object that is displayed on a 2D surface display has and ODV associated with it.

The general overall system architecture of the invention has been described with reference to FIG. 1, and the classroom design for a local classroom and a first and second remote classroom have been described with reference to FIGS. 9, 10 and 11 respectively. Although in practice of the invention there may be a lesser or greater quantity of remote classrooms than what have been described thus far, the inventors have conducted many classroom design experiments and have therefore determined empirically that the unique and advantageous aspects of the invention can be adequately described in enabling detail using the classroom examples described heretofore.

In practice of the invention the system must be in one of a variety of certain "states" or modes as they are also termed. A state describes the interaction type, i.e. which classroom participants are interacting with one another. Depending on the state of interaction, the system intelligently and automatically decides which camera feed is displayed to which display device and classroom location. So it is actually the interactions themselves, and associated gesture triggering which determine what is displayed where.

There are three basic states or "modes" that are defined for the system. These are instruction mode, interaction mode and discussion mode. It is noted that there are other modes or states in which the system may operate, and the invention is certainly not limited to the aforementioned basic states. However, the inventors have determined that describing practice of the invention in at least the three basic states will adequately enable one of ordinary skill in the art.

Instruction mode is where in a local classroom such as classroom 901 of FIG. 9, teacher 903 is at stand in the front and center of the classroom facing the students physically present in the classroom for instance, and lecturing generally to the local students as well as those viewing remotely from remote classrooms such as classrooms 1001, FIG. 10 and classroom 1101, FIG. 11. In this state the teacher is not interacting with any student or classroom of students specifically; rather a general lecture is being given to the entire student participant audience, whether they be local or remote. However, in the local classroom the setting and perception of the teacher and students is a natural one as the teacher and local students are able to view each other face to face "live" in the same classroom. It is one object of the invention to recreate this sense of immersion for the students in the remote classrooms.

Interaction mode is when the teacher is interacting with a specific student or classroom of students. In this mode the teacher in the local classroom may for example be directing information to a particular classroom in response to a student in that classroom asking a question of the teacher. The teacher is able to elicit information or response from a remote student, and vice versa.

Discussion mode is when the teacher and the students from any of the classrooms, whether local or remote may interact with one another. In this state an individual student from one remote classroom may interact with any of those from another classroom. This is an open discussion mode and information between teacher and students, as well as student to student interaction may occur freely.

As previously mentioned, there are other engagement states which will exist in practice of the invention. These states may include states wherein the teacher is engaged with the local students exclusively and either the teacher or students are speaking, similar engagements between teacher and remote students, local and remote students engaged exclusively, remote students engaged exclusively, and so on. However, the specification will describe practice of the invention in at least the three basic states in order to adequately enable one of ordinary skill in the art.

The system transitions between states depending on the interaction type, and the transition between states must be initiated. The initiation of a state determines what state the system will be in. For example, the instruction mode may be initiated by the simple action of the teacher entering a local classroom of students, viewing the facing students and the students viewing the teacher at stand, and the teacher beginning the lecture. The system is assumed to be in this state at the beginning of each classroom session. The teacher may also enter the system into instruction mode by some manual switching means as well. Interaction mode on the other hand, is initiated when for instance the teacher wishes to direct information to a particular remote classroom, and points or uses some other physical gesture directed to the local classroom display device which is currently rendering the video feed from that classroom. Discussion mode may be initiated by a student in a remote classroom wishing to interact with students in another classroom for example, by the act of the remote student pointing or using some other physical gesture directed to a display device in that classroom which is currently rendering the video feed of the classroom of student with whom he wishes to interact.

In order for the system to automatically and seamlessly switch between states or modes depending on the ever changing interaction between teacher and students, capture and display the correct video and audio feeds and display them at the right location and time, a triggering mechanism must be employed, and the triggers must be system-recognizable. To achieve this end, the system of the invention employs a gesture recognition mechanism whereby the system locates the object (teacher or student) that is initiating the change of system state by physical gesture such as finger pointing, hand pose, nodding of head, and so on. The system then understands and classifies the gestures based on a pre-determined set of gesture variables.

The gesture recognition mechanism is preceded by an object tracking system which identifies the coordinates of the classroom participants (see spherical coordinate system, FIG. 3). Such an object tracking system is well known in the art and the present invention utilizes a commercially available system and off-the-shelf (OTS) algorithm to achieve this end. The gesture recognition mechanism is "trained" to recognize a predetermined set of physical gestures which may be used in a typical classroom setting. Such gestures may include hand pose estimation, palm and finger tracking, head pose estimation, arm waving, full body movement (stepping forward), etc. The set of recognized gestures could be expanded as required, and shall not be a limiting factor in practicing the invention in its scope and spirit.

Each classroom of the MCP tele-immersive environment of the invention, whether local or remote, has an object tracking system and gesture recognition mechanism employed therein. Camera feed switching occurs when for instance when a physical gesture is recognized and estimated by a set of gesture recognition systems. Based on the gesture recognized, a trigger is generated and sent to the dedicated server node connected to the high speed LAN of the classroom. The server node identifies the interaction state and computes the feed-to-display mapping based on the ODV model. Appropriate feeds are routed to the correct displays located in the appropriate classrooms through a multicast network to optimize the performance.

In order to exemplify the invention in practice the following scenarios are described for the three different basic states or modes of the system which are instruction mode, interaction mode and discussion mode as previously noted. In actual practice of the invention there may be more interaction scenarios or "sub" states which may exist in different situations. However, the inventors have determined that describing practice of the invention in at least the three basic states according to the following scenarios will adequately enable one of ordinary skill in the art. It is important to note that the system can be in only one mode or "state" at a time. For example, the system cannot be in an interaction state wherein the local teacher is interacting with one of the remote classrooms, and another remote classroom is at the same time interacting with students in the local classroom. In order for accurate and effective switching and pairing of capture to display devices to occur, the system state at any given time must be unique and specific. Whichever state the system is in at any one time, it is the aim of the invention to provide an immersive experience for the teacher as well as for the students of the classrooms whether they are local or remote students. FIGS. 9, 10 and 11 as well as the following device mapping tables will be referenced alternatively as an aid in explanation.

Each of the classroom objects depicted in local classrooms 901, 1001 and 1101 have a corresponding object vector (OV) associated with them. Whenever an object is observing another object, the OV transforms itself into another OV. Further, any object that is displayed on a 2D display device has an object dependent vector (ODV) associated with it. In order to achieve the purpose of causing virtual objects displayed in 2D to behave as "real" 3D objects, the system switches between various projections of the virtual objects. The algorithm utilized by the system calculates the ODV and observer vector (OV) angles to arrive at the desired display outcome in an MCP environment. Based on the calculations the system algorithm determines which projection is to be displayed on which display device (feed switching).

As an aid in describing scenarios of the system in the three main states or modes, which are instruction, interaction and discussion, device switching and mapping information for the local and remote classrooms will be referenced, as provided by the following set of tables, one table for each classroom, which show the calculated values of the switching algorithm in a simplified MCP scenario. Each table enlists the device mapping between the capture devices and the rendering devices for its respective classroom. The switching algorithm is primarily triggered by the changes in the information source and information sink.

For example, when a primary information source such as teacher 903 (LC-1-T1) in local classroom 901 OF FIG. 9 directs information to the students (RC-1-S-x) of the first remote classroom 1001 of FIG. 10, the algorithm calculates the device mapping and determines which capture device in the local classroom is to be mapped to which display device in the remote classroom. The teacher will use some sort of physical gesture such as described previously to indicate that the information is to be directed to the remote classroom, and the system will recognize the gesture and calculate and employ the appropriate device feed switching.

FIG. 12 is a table illustrating device mapping for the local tele-immersive environment of FIG. 9 according to an embodiment of the invention. Table 1201 has a first and second column which denotes the information source and information sink respectively. In the top row and to the right of the information source and sink, the display devices for the local classroom are shown at the top of each column. For each set of information source and sink, the classroom display devices shown in the top row of the table will require a specific feed from a specific classroom capture device. These specific feeds are shown in the remaining columns in the spaces below each display device.

As can be seen in table 1201 referring to the information source column, although a teacher (LC-1-T-1) is defined in the system of the invention as a primary information source, local students (LC-1-S-x) or remote students (RC-1-S-x) may also be considered information sources. Students are considered primary information sinks, but in some situations (not shown in mapping tables) a teacher may also become an information sink.

One example from table 1201 will now be explained in order to exemplify the device mapping convention as it relates to the local and remote classrooms of FIGS. 9, 10 and 11. Consider that the system is in the initial instruction mode wherein the teacher is facing forward and lecturing but not directing information to any one particular classroom. The pairing of information source LC-1-T-1 (teacher 903, FIG. 9) and information sink LC-1-S-x (local students 935, FIG. 9) as shown in table 1201 will be used in this example. In this scenario teacher 903 is at stand in front of the classroom giving a lecture and local students 935 are seated in front of the teacher, and the teacher and students are facing each other in the center of the classroom. This is a natural setting for the teacher and students because they are physically located in the same classroom and view each other directly in a face-to-face manner. The local students observe the teacher facing them, and may also view a large display of the teacher from whiteboard 905, FIG. 9 provided by the feed from camera 929 (LC-1-VC-2), FIG. 9.

In this scenario the lecture being given is simultaneously multicast to the remote classrooms 1001, 1101 of FIGS. 10 and 11. Since the observing participants include students from the remote classrooms, it is desirable that the local students have a sense of immersion such that the remote students appear to be in the same local classroom. It is also desirable that the remote students observing the lecture have a sense of immersion such that not only the lecturing teacher appears to be present in their remote classrooms, but the observing students in the other classrooms appear to be present as well. Further, it is desirable that the lecturing teacher has a sense of immersion such that the students in the remote classrooms appear to be in the local classroom observing the lecture and gazing towards the teacher. To paraphrase, the teacher wants to see all of the students, local or remote, looking directly at her/him, the local students want to see the remote students looking at the teacher who is in the physical presence of the local students, and the remote students want to see the teacher appear to be in their classroom facing them and the students in the other classrooms appearing to be in their classroom as well looking at the teacher. The invention provides such immersion providing all of the desired views to all of the participants of the local and remote classrooms simultaneously and either absolutely or virtually while the lecture is being given.

Now referring to table 1201 of FIG. 12, for the above scenario the device pairing of information source LC-1-T-1 (teacher 903, FIG. 9) and information sink LC-1-S-x (local students 935, FIG. 9) will be referenced. As shown in the table for this info source/info sink pairing, the display device LC-1-VD-2 (915, FIG. 9) which is viewable by the local students, renders the feed from capture device RC-1-VC-2 (1015, FIG. 10) which captures a view of the remote students (RC-1-S-x) in remote classroom 1 at a 45 degree angle. The result is a 2D display on LC-1-VD-2 (915, FIG. 9) viewable by the local students to their left side at a 45 degree angle, depicting the remote students from remote classroom 1 appearing to be looking at the teacher in the local classroom, since the image of the remote classroom 1 students is captured in the remote classroom at a 45 degree angle.

The local students are able to simultaneously view the students (RC-2-S-x) of the remote classroom 2 appearing to be looking at the teacher as well. For the same source/sink pairing as is also shown in table 1201, display device LC-1-VD-4 (917, FIG. 9) which is viewable by the local students to their right at a 45 degree angle, renders the feed from capture device RC-2-VC-4 (1117, FIG. 11) which also captures a view of the remote students, but at an opposite 45 degree angle from that of RC-1-VC-2, remote classroom 1. The result is a 2D display from LC-1-VD-4 viewable on the right side at a 45 degree angle by the local students, depicting the remote students from remote classroom 2 also appearing to be looking at the teacher in the local classroom, since the image of the remote students is captured in the remote classroom 2 at a 45 degree angle.

For the teacher's perspective, to achieve the immersive experience during this instruction mode, the teacher would like to see the students of the remote classrooms appearing to be looking at her/him during the lecture. Referring again to table 1201 and the same source/sink pairing described above, display device LC-1-VD-1 (911, FIG. 9) is the device viewable by teacher 903 at an angle to the teacher's right side. According to table 1201 display LC-1-VD-1 requires the feed from RC-1-VC-4inv*. As shown in the footer of table 1201, inv*=lateral projection. Therefore, the display from the RC-1-VC-4 (1017, FIG. 10) device is flipped horizontally. The result in this mode is a 2D display from LC-1-VD-1 viewable by the teacher at an angle to the teacher's right side, depicting the remote students from remote classroom 1 appearing to be looking at the teacher, since the image of the remote students is captured in the remote classroom 1 at a 45 degree angle. As mentioned the display is automatically flipped horizontally to give the proper perspective to the local teacher.

Display device LC-1-VD-3 (913, FIG. 9) is the device viewable by teacher 903 at an angle to the teacher's left side. According to table 1201 display LC-1-VD-3 requires the feed from RC-2-VC-2inv*. The display for LC-1-VD-3 from capture device RC-2-VC-2 (1017, FIG. 10) device is also flipped horizontally. The result in this pairing mode is a 2D display from LC-1-VD-3 viewable by the teacher at an angle to the teacher's left side, depicting the remote students from remote classroom 2 appearing to be looking at the teacher, since the image of the remote students is captured in the remote classroom 2 at a 45 degree angle, and the display for LC-1-VD-3 is automatically flipped horizontally to give the proper perspective to the local teacher.

FIG. 13 is a table illustrating device mapping for the first remote tele-immersive environment of FIG. 10, or remote classroom 1 according to an embodiment of the invention. The scenario and device mapping previously described in the examples for table 1201 are for when the system is in instruction mode where the teacher is at stand in the local classroom lecturing while not directing information to any classroom in particular. The same is true in the following example for remote classroom 1 device mapping.

An example of the invention in practice according to device mapping as shown in table 1301 will exemplify the device mapping convention as it relates to remote classroom 1 of FIG. 10. Teacher 903 has a view to the right at an angle of display 911 which provides a display of the students of remote classroom 1 as provided by a device of the camera array directed at the students of that classroom. Teacher 903 also has a view to the left at an angle of display 913 which provides a display of the students of remote classroom 2 as provided by a device of the camera array directed at the students of that classroom.

The pairing shown in table 1301 of information source LC-1-T-1 (local teacher) and information sink RC-2-S-x (remote students 1123, FIG. 11) will be used in this example for the device mapping of classroom 1. When the system is in the initial starting state or instruction mode, teacher 903 (FIG. 9) is at stand in front of the local classroom and local students 935 (FIG. 9) are seated in front of the teacher, and the teacher and local students are facing each other in the center of the classroom. The local students observe the teacher facing them in a natural setting, and may also view a large display of the teacher from whiteboard 905, FIG. 9 provided by the feed from camera 929 (LC-1-VC-2), FIG. 9.

The scenario is simultaneously multicast to the remote classrooms 1001, 1101 of FIGS. 10 and 11 respectively. Since the observing participants include students from the remote classrooms, it is desirable that the local students have a sense of immersion such that all of the remote students appear to be in the same classroom. For the remote students observing the interaction it is also desirable that they have a sense of immersion such that not only the local teacher appears to be present in their remote classrooms, but the observing students in the other classrooms appear to be present in their particular classroom as well. Further, it is desirable that the local teacher has a sense of immersion such that the students in the remote classrooms appear to be in the local classroom observing and "looking" at the teacher.

Now referring to table 1301 of FIG. 13 showing device mapping for remote classroom 1, the device pairing of information source LC-1-T-1 (teacher 903, FIG. 9) and information sink RC-2-S-x (remote classroom 2 students 1023, FIG. 10) will be referenced. As shown in the table for this info source/info sink pairing, the display device WB (1005, FIG. 10) which is viewable by the students of remote classroom 1 while facing forward, renders the feed from capture device LC-1-VC-2 (919, FIG. 9) which captures a view of the local teacher facing forward. The resulting 2D display of WB 1005 displays the local teacher as if the teacher was at stand in front of remote classroom 1 facing the remote classroom 1 students.

Remote classroom 1 (1001, FIG. 10) has two additional display devices RC-1-VD-1 (1009) and RC-1-VD-2 (1011) which further afford the students of that classroom with the tele-immersive viewing experience by displaying the student participants in the local classroom and remote classroom 2 respectively, as if they were present in remote classroom 1. In table 1301 and the info source/sink pairing in this example, display device RC-1-VD-1 which is viewable at an angle to the left by remote classroom 1 students 1023 and designated for displaying students from the local classroom, renders a 2D display of the feed from capture device LC-1-VC-8 (933, FIG. 9). Since LC-1-VC-8 captures a view of the local students facing forward from their right side at a 90 degree angle, display device RC-1-VD-1 as mapped to capture device LC-1-VC-8 depicts the local students appearing to be looking at the teacher as displayed in remote classroom 1 on WB 1005.

Now referring to remote classroom 1 display device RC-1-VD-2 which is viewable by remote classroom 1 students 1023 at an angle to their right side while facing forward, and designated for displaying students from remote classroom 2. According to the info source/sink pairing example in table 1301 FIG. 13, RC-1-VD-2 renders a 2D display of the feed from remote classroom 2 capture device RC-2-VC-1 (1119, FIG. 11). Since RC-2-VC-1 captures a view of the remote classroom 2 students facing forward from their left side at a 90 degree angle, display device RC-1-VD-2 as mapped to capture device RC-2-VC-1 depicts the remote classroom 2 students appearing to be looking at the teacher since the teacher displayed in remote classroom 1 on WB 1005 in front of the classroom.

In this scenario in remote classroom 1, the classroom 1 students are provided the sense of immersion by viewing to the left the students of the local classroom as if they were in the same room looking at the teacher in front (WB 1005 display), viewing to the right the students of remote classroom 2 as if they were in the same room looking at the teacher in front (WB 1005 display), and a view of the teacher displayed by WB 1005 as if at stand in front of remote classroom 1.

FIG. 14 is a table illustrating device mapping for the second remote tele-immersive environment of FIG. 11 according to an embodiment of the invention. The scenario and device mapping previously described in the examples for tables 1201 and 1301 are for when the system is in instruction mode where the teacher is at stand in the local classroom lecturing while not directing information to any classroom in particular. The same is true in the following example for remote classroom 2 device mapping.

An example of the invention in practice according to device mapping as shown in table 1401 will exemplify the device mapping convention as it relates to remote classroom 2 of FIG. 11. Teacher 903 has a view to the right at an angle of display 911 which provides a display of the students of remote classroom 1 as provided by a device of the camera array directed at the students of that classroom. Teacher 903 also has a view to the left at an angle of display 913 which provides a display of the students of remote classroom 2 as provided by a device of the camera array directed at the students of that classroom.

The pairing shown in table 1401 of information source LC-1-T-1 (local teacher) and information sink RC-1-S-x (remote students 1023, FIG. 11) will be used in this example for the device mapping for classroom 2. When the system is in the initial starting state or instruction mode, teacher 903 (FIG. 9) is at stand in front of the local classroom and local students 935 (FIG. 9) are seated in front of the teacher, and the teacher and local students are facing each other in the center of the classroom. The local students observe the teacher facing them in a natural setting, and may also view a large display of the teacher from whiteboard 905, FIG. 9 provided by the feed from camera 929 (LC-1-VC-2), FIG. 9.

Now referring to table 1401 of FIG. 14 showing device mapping for remote classroom 2, the device pairing of information source LC-1-T-1 (teacher 903, FIG. 9) and information sink RC-1-S-x (remote classroom 1 students 1023, FIG. 10) will be referenced. As shown in the table for this info source/info sink pairing, the display device WB (1105, FIG. 11) which is viewable by the students of remote classroom 2 while facing forward, renders the feed from capture device LC-1-VC-2 (919, FIG. 9) which captures a view of the local teacher facing forward. The resulting 2D display of WB 1105 displays the local teacher as if the teacher was at stand in front of remote classroom 2 facing the remote classroom 2 students.

Remote classroom 2 (1101, FIG. 11) has two additional display devices RC-2-VD-1 (1109) and RC-2-VD-2 (1111) which further afford the students of that classroom with the tele-immersive experience by displaying the student participants in the remote classroom 2 and local classroom respectively. In table 1401 and the info source/sink pairing in this example, display device RC-2-VD-1 which is viewable at an angle to the left by remote classroom 2 students 1123 and currently designated for displaying students from the other remote classroom (1), renders a 2D display of the feed from capture device RC-1-VC-5 (1021, FIG. 10). Since RC-1-VC-5 captures a view of the remote classroom 1 students facing forward from their right side at a 90 degree angle, display device RC-2-VD-1 as mapped to capture device RC-1-VC-5 depicts the remote classroom 1 students appearing to be looking at the teacher as displayed in remote classroom 2 on WB 1105.

Now referring to remote classroom 2 display device RC-2-VD-2 which is viewable by remote classroom 2 students 1123 at an angle to their right side while facing forward, and currently designated for displaying students from the local classroom. According to the info source/sink pairing example in table 1401 FIG. 14, RC-2-VD-2 renders a 2D display of the feed from local classroom capture device LC-1-VC-4 (931, FIG. 9). Since LC-1-VC-4 captures a view of the local classroom students facing forward from their right side at a 90 degree angle, display device RC-2-VD-2 as mapped to capture device Since LC-1-VC-4 depicts the local classroom students appearing to be looking at the teacher as displayed in remote classroom 2 on WB 1105.

In this scenario in remote classroom 2, the classroom 2 students are provided the sense of immersion by viewing to the left the students of remote classroom 2 as if they were in the same room looking at the teacher in front (WB 1105 display), viewing to the right the students of the local classroom as if they were in the same room looking at the teacher in front (WB 1105 display), and a view of the teacher displayed by WB 1105 as at stand in front of the remote classroom 2.

The above use-case scenarios and device mapping examples from tables 1201, 1301 and 1401 have been demonstrated for when the system is in instruction mode wherein the local teacher is at stand in the front of a local classroom giving a lecture for example, and not directing information to any particular student group whether local or remote. The tele-immersive fashion in which the teacher and students perceive each other in each classroom has been exemplified for this system state. However, in the following scenario example the system state will transition from instruction mode to interaction mode, and an example of the system gesture recognition, feed switching; device mapping and tele-immersive perception of the local teacher and local and remote students will be exemplified.

Consider now that the system is in the initial instruction mode or "starting state" wherein the teacher (teacher 903, FIG. 9) is at stand in front of the local classroom interacting with students and is not directing information to any particular classroom. This is the beginning state of the system which may be initiated by the teacher entering the local classroom wherein the local students are present and beginning a lecture, or by some other automated or manual means. Consider also that all of the capture and display/render devices of the local classroom and both remote classrooms are in operation, and the local lecture is being multicast to the remote classrooms. That is, all of the participants in the multipoint classroom participation (MCP) environment, whether local or remote, perceive each other visually and audibly either virtually or absolutely.

Now in the following example, the system will switch from instruction mode to interaction mode. Such system mode switching is termed "state transition". During the lecture when the system is in instruction mode, in response to a physical gesture such as a student in remote classroom 2 raising a hand to ask a question, the local teacher has indicated by gesturing in some manner such as hand posing for example, that the direction of information will be to remote classroom 2 to begin interaction. In this case the teacher has gestured and turned toward display device LC-1-VD-1 (913, FIG. 1) which is currently displaying the students of remote classroom 2 viewable to the teacher. The system knows the physical location of the teacher within the local classroom via the coordinate system (301, FIG. 3) and the gesture recognition system executed by the dedicated server of the local classroom has recognized the teacher's gesture direction to display 913, and the gesture automatically triggers the system to switch from instruction mode to interaction mode. In this "state transition" the system algorithm then causes the appropriate device switching and mapping to occur as follows.

Referring to local classroom 901, FIG. 9, consider that the system has switched from the instruction state to interaction state, and in response to the remote classroom 2 student gesture, the local teacher is directing information to the students of remote classroom 2 and facing display LC-1-VD-3 which displays remote classroom 2 students viewable by the teacher. The information source and sink pairing for remote classroom 2 is then LC-1-T-1 (local teacher) and RC-2-S-x (remote classroom 2 students). By facing display LC-1-VD-3 the teacher is also facing capture device LC-1-VC-3 at the angle indicated. Capture device LC-1-VC-3 then captures local teacher 903 facing the device, and the camera feed is then displayed on WB 1105 in classroom 2 as a 2D display of the teacher facing the classroom 2 students.

The perspective of the classroom 2 students as it pertains to the students of remote classroom 1 and those of the local classroom is then tele-immersive as remote classroom 2 display device RC-2-VD-1 is now mapped to remote classroom 1 capture device RC-1-VC-4, and remote classroom 2 display device RC-2-VD-2 is now mapped to local classroom capture device LC-1-VC-7. The resulting tele-immersive perspective for classroom 2 students is provided by a 2D display on RC-2-VD-1 of the students of remote classroom 1 appearing to have gaze directed to WB 1105 which is displaying teacher 903, and a 2D display on RC-2-VD-2 of the local students also appearing to have gaze directed to WB 1105.

The tele-immersive perception of the remote classroom 1 students during this interaction between teacher 903 and the students of remote classroom 2, is as previously described in reference to device mapping table 1301 for remote classroom 1, wherein display device RC-1-VD-1 which is viewable at an angle to the left by remote classroom 1 students 1023 and currently designated for displaying students from the local classroom, renders a 2D display of the feed from capture device LC-1-VC-8 (933, FIG. 9). Since LC-1-VC-8 captures a view of the local students facing forward from their right side at a 90 degree angle, display device RC-1-VD-1 as mapped to capture device LC-1-VC-8 depicts the local students appearing to be looking at the teacher as displayed in remote classroom 1 on WB 1005. At the same time, display device RC-1-VD-2 which is viewable at an angle to the right by remote classroom 1 students 1023 and currently designated for displaying students from remote classroom 2, renders a 2D display of the feed from capture device RC-2-VC-1 (1119, FIG. 11). RC-2-VC-1 captures a view of the local students facing forward from their left side at a 90 degree angle, display device RC-1-VD-2 as mapped to capture device RC-2-VC-1 depicts the local students appearing to be looking at the teacher as displayed in remote classroom 1 on WB 1005.

The tele-immersive perception of the teacher in the local classroom during this teacher/student interaction with classroom 2 is provided by display devices LC-1-VD-1 currently displaying the students of remote classroom 1, and LC-1-VD-3 currently displaying the students of remote classroom 2, both devices viewable by the teacher at an angle to the right and left respectively. Local display device LC-1-VD-1 is mapped to remote classroom 1 capture device RC-1-VC-3 which captures the remote 1 students facing forward, resulting in a 2D display on LC-1-VD-1 of the remote 1 students appearing to be looking at the teacher. Local display device LC-1-VD-3 is mapped to remote classroom 2 capture device RC-2-VC-3 which captures the remote 2 students facing forward, resulting in a 2D display on LC-1-VD-3 of the remote 2 students appearing to be looking at the teacher.

As mentioned previously there are three basic states or "modes" in the system, those being instruction mode, interaction mode and discussion mode. Instruction mode is when the teacher object takes the role of primary information source and the student objects take the role of information sink. In instruction mode the teacher is lecturing generally in a local classroom, students are in the local classroom and the teacher is not interacting with any classroom of students specifically. The local classroom teacher and students in this mode face each other in a generally natural setting, and the students therefore see the teacher directly. It is important to note that the system is assumed to be in the instruction mode at the start of the class, and the beginning of the class lecture is the initiation of the instruction mode or state.

Interaction mode is when the teacher object directs information to a particular student object or set of same i.e., the teacher is interacting with a specific student or classroom of students. The Interaction mode is initiated for example, when the teacher wishes to interact with a specific classroom and invokes a physical gesture such as finger pointing, arm waving or some other similar physical gesture. The system recognizes this gesture from a pre-determined list of triggering gestures, and switches to the interaction state based on the gesture and direction thereof.

Examples have been previously demonstrated with reference to capture/render device mapping for the local and remote classrooms according to the device mapping tables as shown in FIGS. 12, 13 and 14 wherein the system is in instruction and interaction mode. Discussion mode is when the teacher object and student objects may take the role of both information source and information sink. For example, in discussion mode the local teacher and students from any of the classrooms local or remote, are enabled to interact with one another, either teacher/student or student/student. In this mode, the teacher may initiate interaction with any local or remote students, any student may initiate interaction with teacher and students may initiate interaction with other students whether locally or remotely. Such interaction initiation may include physical gestures by teacher or student such as pointing or some other physical gesture which triggers the system to enter the discussion state. The following use case scenario example is demonstrated for when the system is in discussion mode, wherein the students from remote classrooms are interacting with each other.

Consider now that the system is in the initial instruction mode or "starting state" wherein the teacher is at stand in front of the local classroom interacting with students and is not directing information to any particular classroom. This is the beginning state of the system which may be initiated by the teacher entering the local classroom wherein the local students are present and beginning a lecture, or by some other automated or manual means. Consider also that all of the capture and display/render devices of the local classroom and both remote classrooms are in operation, and the local lecture is being multicast to the remote classrooms. That is, all of the participants in the multipoint classroom participation (MCP) environment, whether local or remote, perceive each other visually and audibly either virtually or absolutely.

Now in the following example, the system will perform a state transition switching from instruction mode to discussion mode. In this use case scenario, during the lecture when the system is in either instruction or interaction mode, in response to a physical or audio gesture such as a student in remote classroom 2 raising a hand to ask a question, a student in remote classroom 1 indicates by gesturing in some manner such as hand posing for example, that the remote classroom 1 student wishes to direct information to the student(s) of remote classroom 2 to begin discussion. In this case the remote 1 student has gestured and turned toward display device RC-1-VD-2 (1011, FIG. 10) which is currently displaying the students of remote classroom 2 viewable to the remote classroom 1 students at an angle to their right. The system knows the physical location of the remote classroom 1 students within the classroom via the coordinate system (301, FIG. 3) and the gesture recognition system executed by the dedicated server of the remote classroom 1 has recognized the remote classroom 1 student's gesture direction to display 1011, and the gesture automatically triggers the system to switch from instruction mode to discussion mode. In this "state transition" the system algorithm then causes the appropriate device switching and mapping to occur according to table 1401, FIG. 14 as follows, wherein the information source is RC-1-S-x (remote classroom 1 students) and the information sink is RC-2-S-x (remote classroom 2 students).

Referring to remote classroom 2 (1101, FIG. 11), consider that the system is now in discussion mode, and in response to the remote classroom 2 student gesture, a remote classroom 1 student is directing information to the students of remote classroom 2 and facing display RC-1-VD-2 which displays remote classroom 2 students viewable by the remote classroom 1 students to the right. By facing display RC-1-VD-2 the remote 1 student is also facing capture device RC-1-VC-4 (1017) at the angle indicated. Capture device RC-1-VC-4 then captures an image of the remote 1 student facing the device, and the camera feed is displayed on RC-2-VD-1 in classroom 2 as a 2D display of the remote classroom 1 student appearing to be facing the classroom 2 students.

In this use case scenario of the system in discussion mode, the perspective of the remote classroom 2 students as it pertains to the students of remote classroom 1 and those of the local classroom is then tele-immersive being that remote classroom 2 display device RC-2-VD-1 is now mapped to remote classroom 1 capture device RC-1-VC-4, and remote classroom 2 display device RC-2-VD-2 is now mapped to local classroom capture device LC-1-VC-4. The resulting tele-immersive perspective for classroom 2 students is provided by a 2D display on RC-2-VD-1 of the students of remote classroom 1 appearing to have gaze directed to the remote classroom 2 students as captured by RC-1-VC-4, and a 2D display on RC-2-VD-2 of the local students appearing to have gaze directed towards the students of remote classroom 1 as displayed on device RC-2-VD-1 and captured by device LC-1-VC-4 in the local classroom.

The tele-immersive perception of the remote classroom 1 students during this discussion wherein information is being directed from the students of remote classroom 1 to those of remote classroom 2, is that RC-1-VD-1 (FIG. 10) which is viewable at an angle to the left by remote classroom 1 students 1023 and currently designated for displaying students from the local classroom, renders a 2D display of the feed from capture device LC-1-VC-5 (925, FIG. 9). Since LC-1-VC-5 captures a view of the local students whose gaze is directed towards LC-1-VD-2 while viewing the remote classroom 1 students, the appearance is that the gaze of the local students is directed towards the remote classroom 1 students as displayed by RC-1-VD-1. At the same time, display device RC-1-VD-2 which is viewable at an angle to the right by remote classroom 1 students 1023 and currently designated for displaying students from remote classroom 2, renders a 2D display of the feed from capture device RC-2-VC-2 (1115, FIG. 11). Since RC-2-VC-2 captures a view of the remote classroom 2 students whose gaze is directed towards RC-2-VD-1 while viewing the remote classroom 1 students, the appearance is that the gaze of the remote classroom 2 students is directed towards the remote classroom 1 students as displayed by RC-1-VD-2.

Referring to local classroom 901, FIG. 9, the tele-immersive perception of the teacher in the local classroom during this student/student discussion between remote classrooms 1 and 2 is provided by LC-1-VD-1 viewable to the teacher's right for displaying the students of remote classroom 1, and LC-1-VD-3 viewable to the teacher's left for displaying the students of remote classroom 2. LC-1-VD-1 renders the remote classroom 1 feed from capture device RC-1-VC-3, and displays the remote classroom 1 students appearing to be facing the remote classroom 2 students as displayed on LC-1-VD-3, since RC-1-VC-3 captures the students gazing towards RC-1-VD-2 which displays the remote classroom 2 students. LC-1-VD-2 renders the remote classroom 2 feed from capture device RC-2-VC-3, and displays the remote classroom 2 students appearing to be facing the remote classroom 1 students as displayed on LC-1-VD-1, since RC-2-VC-3 captures the students gazing towards RC-2-VD-1 which displays the remote classroom 1 students.

It is mentioned again that an important purpose of the MPC system in embodiments described is to provide a realistic interaction between a teacher and students in a local classroom, and between the teacher and students in one or more remote classrooms, and between students in the local classroom and the remote classrooms, as much as possible as though the teacher and all of the students are actually in the same classroom. This is accomplished, as described in enabling detail above, by a multiplicity of video cameras (VC) providing to a central system a multiplicity of video feeds of each of the objects in the system, teacher, students, etc., and a multiplicity of video displays. Camera feeds are switched to displays optimally so that the teacher and the students may participate and may follow visually and audibly the activity of other students, the teacher, and other information sources in the system. The switching is accomplished by gestures and manual switching as described in enabling detail above, and shown in a variety of states in tables of FIGS. 12 through 14.

Referring now to FIG. 9, which show the local classroom and placement of VCs, VDs teacher, and students, it is noted that the VDs are placed so the teacher faces the local students straight on, and may interact directly with students in one remote classroom by turning 45 degrees to one side, viewing the remote student or students by VC 1 and VD 1. Vc1 capturing the teacher straight on, and VD 1 allowing the teacher to see with the students in the remote classroom also straight on. The teacher may interact with a second remote classroom by turning to the opposite side, toward VD 3.

In this interactive mode local students can see which way the teacher has turned and gestured, and will know that they may then watch and listen to the same remote student by turning their heads to watch VD 2. This system and arrangement works quite nicely for one local and two remote classrooms. The inventors have arranged and tested a local classroom environment with four remote classrooms, which requires two VDs side by side at each of the locations of VDs in the local classroom shown in FIG. 9, for a total of eight VDs, two to the right of the teacher at about 45 degrees, two to the left of the teacher at about 45 degrees, two to the right of the local students at about 45 degrees, and two to the left of the local students at about 45 degrees. One VC is still sufficient at the angle of the VDs, rather than one per display.

The inventors discovered, however, that as the number of remote classrooms increases, there need to be more VCs to provide feeds at proper angles, and a new problem arises, which presents a difficulty particularly for local students in following the activity of the teacher and the remote students.

Figure 15:
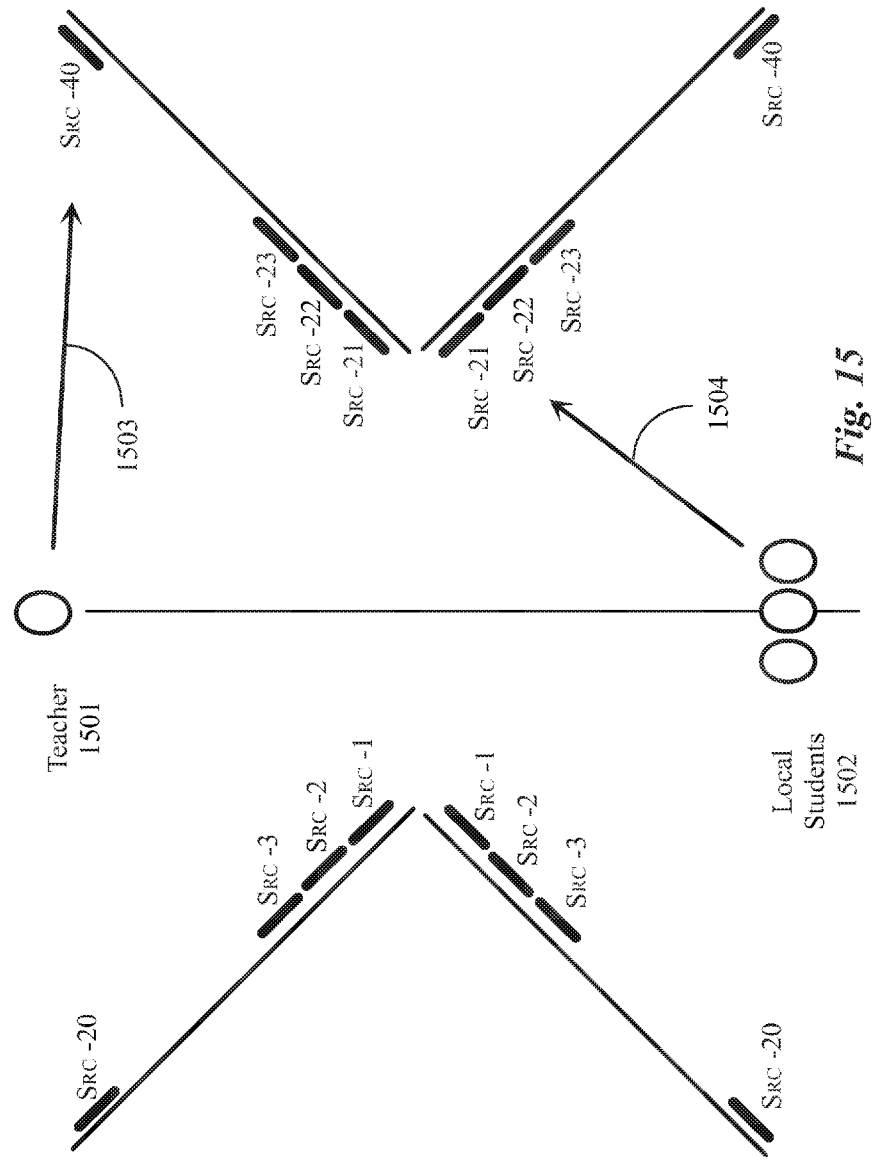
FIG. 15 is a diagram illustrating a local classroom equipped for a system of forty remote classrooms in an embodiment of the invention.

FIG. 15 is a diagram illustrating a local classroom in a system having forty remote classrooms. The teacher 1501 and the local students are shown in their usual positions. A total of forty VDs are shown arranged for viewing by the teacher, twenty to each side, with individual VDs arranged side by side and labeled for dedication to each one of the forty remote classrooms, as SRC-1 through SRC-40, for Student at RC 1 through Student at RC 40. Forty more VDs are shown similarly arrayed to each side for viewing by the local students. In the video switching scheme, as will be apparent from description above, SRC-23, for example for the teacher and the local students, will display the same video feed.

Arrow 1503 shows the direction of attention of the teacher to interact with a student at remote classroom 40. Given this direction of attention for the teacher, the local students, watching the teacher will naturally look to where the teacher is looking, but unfortunately that action will suggest to them that they should be watching the VD for SRC-21. This is a serious anomaly in keeping the geometry of the system consistent as the number of remote classrooms increases.

The geometric arrangement, which works well for a few remote classrooms, and allows local students to follow the gaze and direction of the teacher quite nicely, is based on early experience and assumption that both the location and orientation of a display affects the gaze direction, and therefore the displays needed to be as much as possible at 90 degrees to observers, hence the placement of displays side by side on the approximately 45 degree lines. The anomaly discovered as described above for an increasing number of remote classrooms motivated further study, which reveals the location indeed affects gaze direction, but orientation does not. That is, the viewer will make the same judgments and receive the correct visual input whether the VD is at 90 degrees to the viewer's gaze direction, or at an angle, even a rather steep angle.

Figure 16:
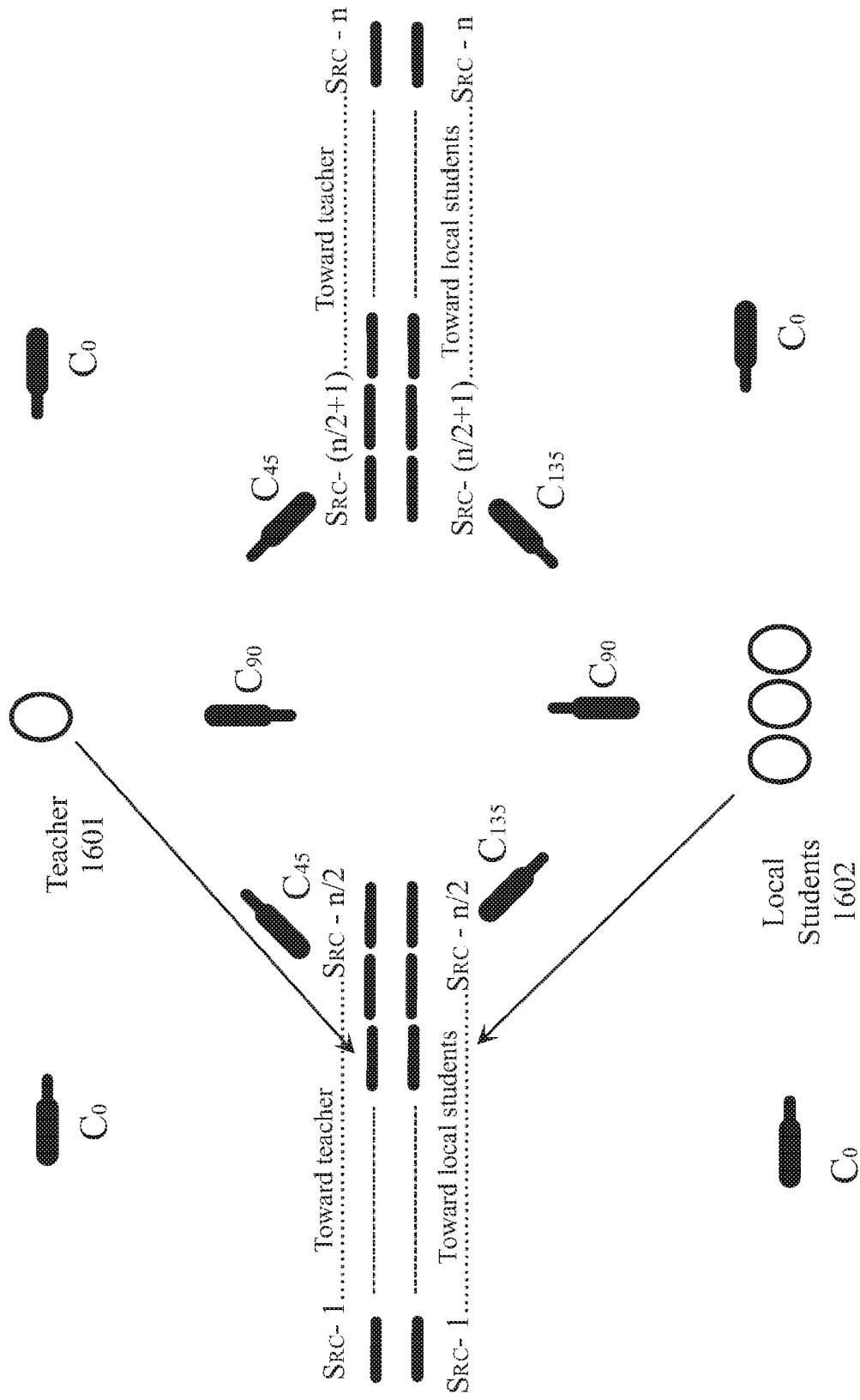
FIG. 16 is a diagram illustrating a new and unique placement of video displays in an embodiment of the present invention.

The inventors have now made a new arrangement for VDs for larger numbers of remote classrooms, and for consistency and standardization of hardware and fixtures, for example, have settled on this new arrangement, which is illustrated nicely in FIG. 16.

In FIG. 16 the position of the teacher and the local students remains the same, and the number and positions of the cameras (C) and their orientation stays the same as in FIG. 9. The video displays (VD) however, are arranged on each side of the local classroom along a horizontal line, with one half on each side. One VD for each remote classroom is provided along this horizontal line with the display facing the teacher. One VD for each local classroom is also arranged along this horizontal line with the displays facing the local students. The result is a back-to-back display for each of the remote classrooms, one facing the teacher and one facing the local students. Now, when the teacher gestures toward a display for a remote classroom, as shown by an arrow from the teacher in FIG. 16, the local students, following the teacher's direction easily focus on the correct display to view the remote students that the teacher is addressing.

In aspects and embodiments of the invention video camera placement and orientation, and pairing of camera feeds with specific ones of displays is important to provide a satisfactory experience for students and teacher in local and remote classrooms. The number of cameras, their placement and orientation, and mapping of camera feeds to displays may vary widely in different embodiments of the invention.

Figure 17:
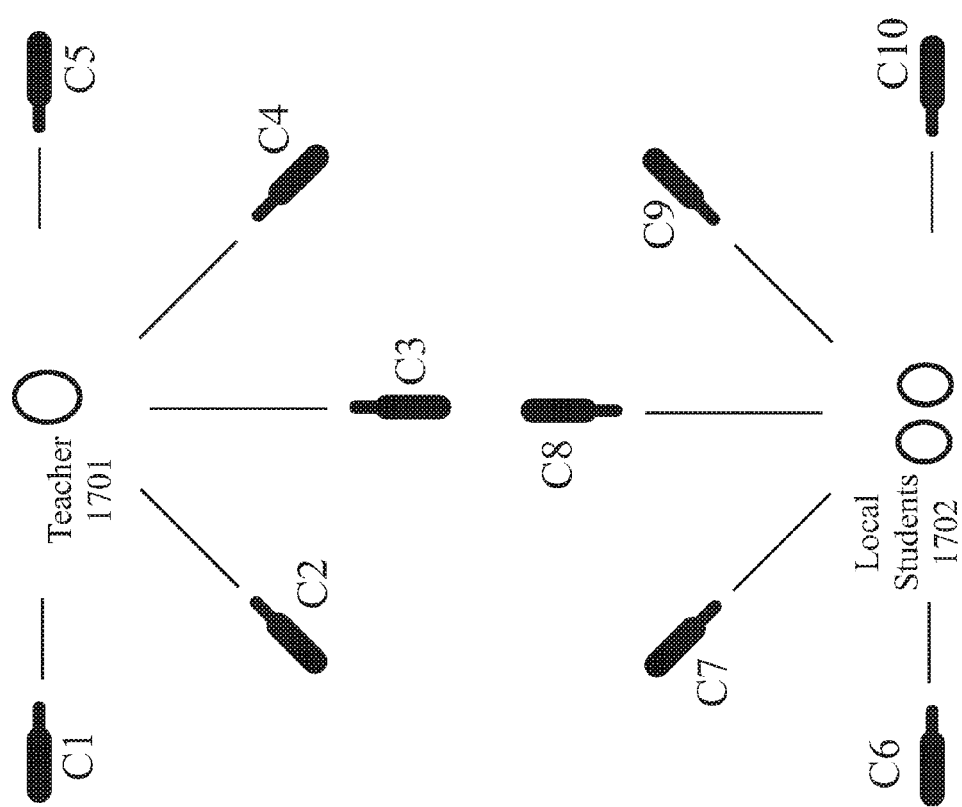
FIG. 17 illustrates a camera placement and orientation in a local classroom in an embodiment of the invention.

FIG. 17 illustrates a camera placement and orientation in a local classroom, much as shown in FIG. 9 for a local classroom in a system of the invention, the system provided for one or no more than just a few remote classrooms. In FIG. 17 display are not shown to be able to clearly illustrate certain features of the invention.

In FIG. 17, for a local classroom, video cameras C1 through C5 are placed and oriented to capture video images of a teacher 1701 from different viewpoints. Cameras C1 and C5 capture images from opposite side views, cameras C2 and C4 from forty-five-degree orientation, and camera C3 straight on toward the teacher, full frontal. Cameras C6 through C10 similarly capture video images of local students 1702. For just a few classrooms and correspondingly few displays (not shown), these cameras and placement are sufficient.

Figure 18:
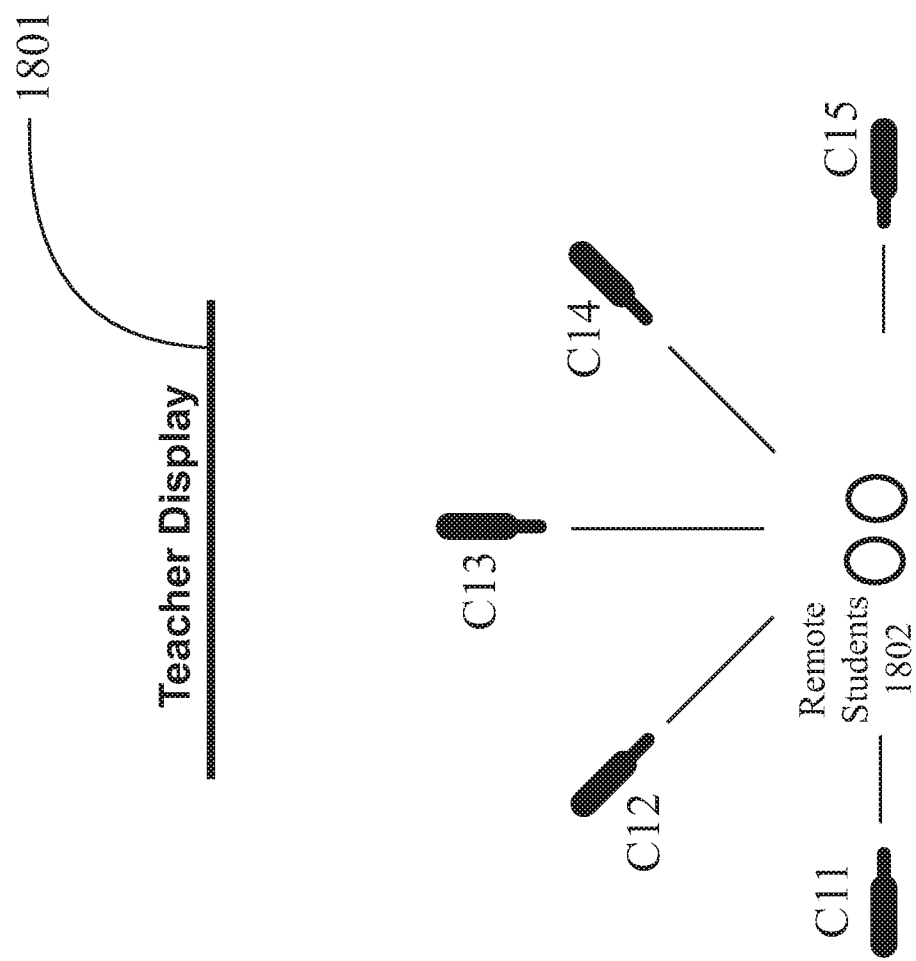
FIG. 18 is a plan view of a remote classroom in the system having a local classroom according to FIG. 17.

FIG. 18 is a plan view of a remote classroom in the system having a local classroom according to FIG. 17. In the remote classroom the placement and orientation of cameras C11 through C15 capture images of remote students 1801 from five different viewpoints. There is no teacher in the remote classroom, but a display showing the teacher in the local classroom, so no cameras are necessary to capture images for a teacher in a remote classroom. Displays in the remote classroom are placed for the remote students to be able to view the teacher and local students, as much as possible as though those persons were in the remote classroom. It should be apparent that there may be more than one remote classroom.

In the following three figures and accompanying description an explanation is provided for one way in which video feeds may be mapped to appropriate displays, in general.

Figure 19:
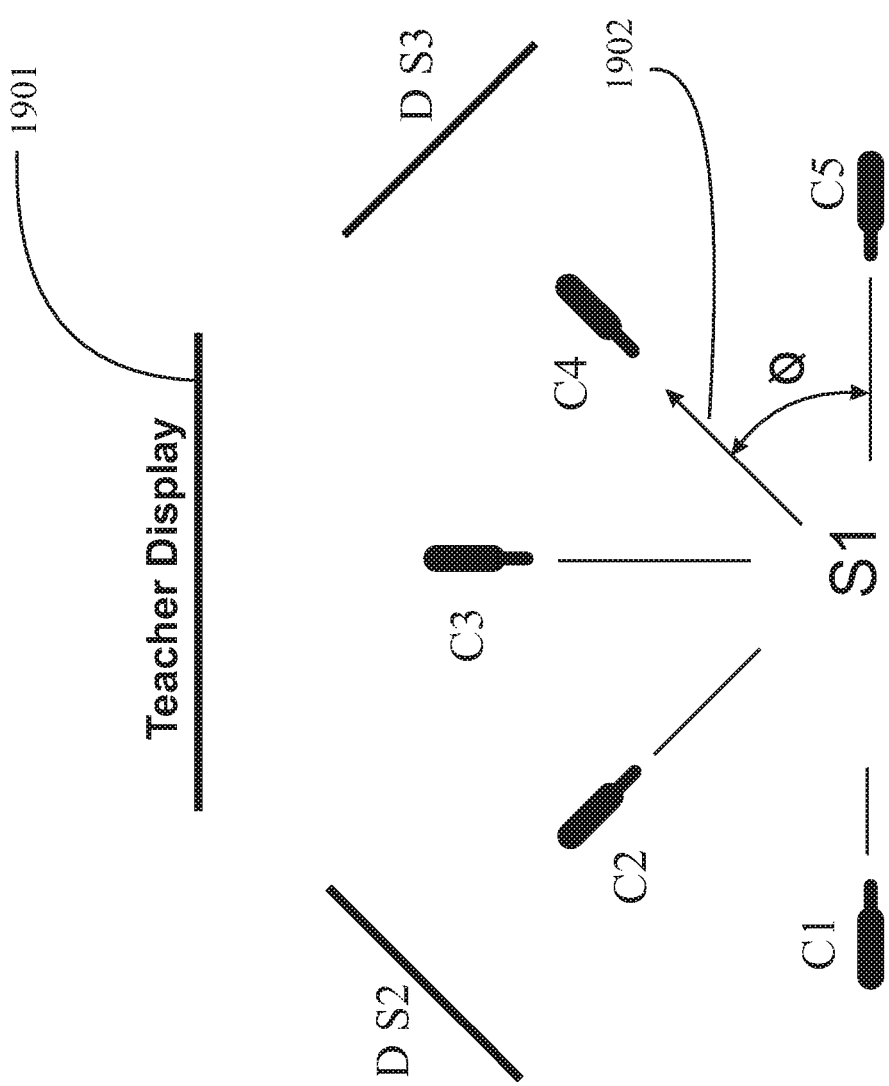
FIGS. 19, 20 and 21 illustrate a method for mapping video feed to a display.
Figure 20:
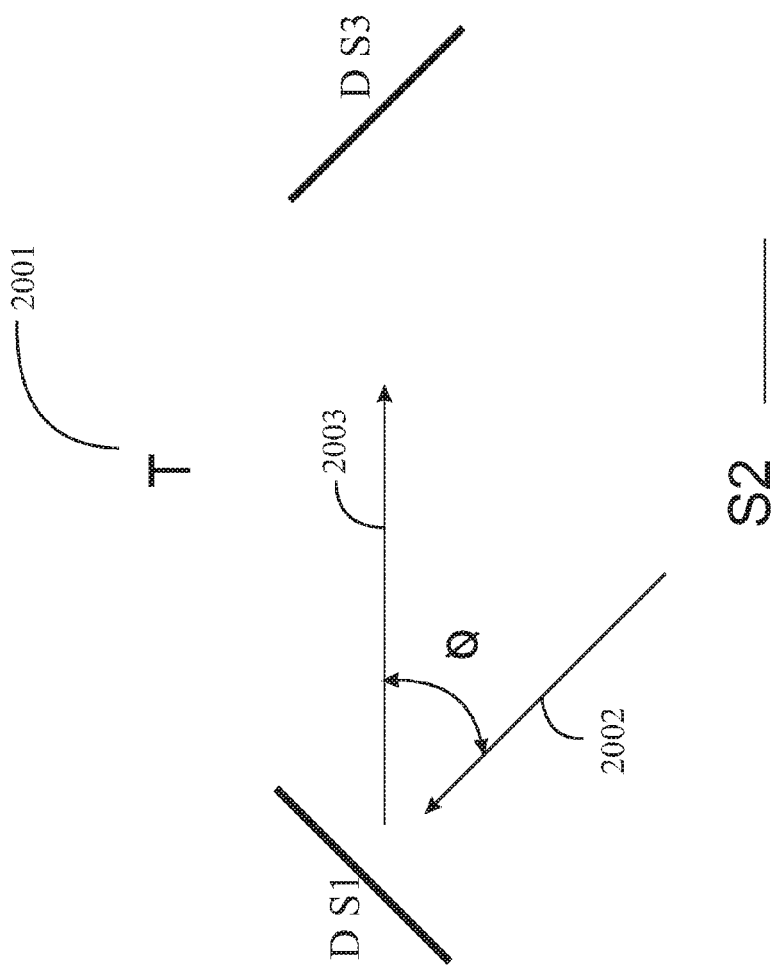
Figure 21:
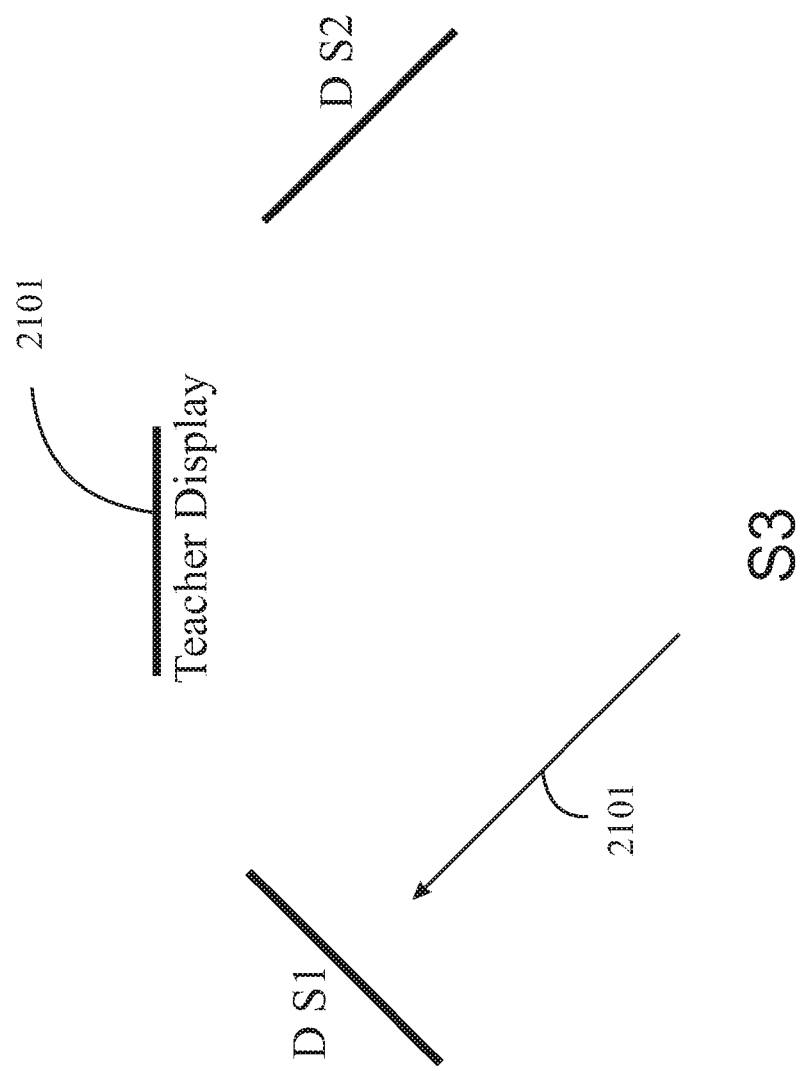

Consider FIGS. 19, 20 and 21. In FIG. 19, depicting a first remote classroom 1, Student S1 is talking to student S3 in another remote classroom 3, depicted in FIG. 21. Student S2 in local classroom 2 is viewing speaker student S1 on display DS1, devoted to that student. How is the correct camera feed for display D S1 to be determined?

Remember that in the view of student S1 in classroom 1, student S3 is actually display D S3, and Student S2 is actually display D S2. The gaze directions for each student in his or her classroom for each other student in a different classroom will be toward the display dedicated to each student. Accordingly, the gaze direction for student S1 in classroom 1, speaking to student S3 in classroom 3, is shown by arrow 1902, at angle φ toward D S3. In classroom 2 (FIG. 20), student S2 is watching student S1 (D S1), who is watching student S3. S2 gaze direction is arrow 2002. The gaze direction for student S3 is arrow 2101 in FIG. 21.

In classroom 2 student S2 should feel that student S1 on display DS1 should look at display DS3 as S1 is talking to S3. This is shown by arrow 2003. The angle made by student S2's gaze vector and the 2003 is φ. So the task is to find the camera that makes angle φ with student S1's gaze direction in classroom 1, FIG. 19. The camera is camera 5. S this is the camera whose video feed is mapped to D S1. As number of cameras, placement, orientation and display placement and orientation is all known in the system, and may be recorded as data accessible to servers in the system, algorithms may be developed to map the correct feeds to displays depending on communication states, that is, who is interacting with whom in the system, which may be switched by gesture or other input.

In yet another embodiment of the invention an arrangement of video cameras and displays is provided that provides more of a three-dimensional effect for viewers of the displays. This is accomplished partly by placement of cameras to0 capture more nuanced viewpoints of the teacher and the students in the local and remote classrooms, and partly by number and placement of displays, providing more nuanced views of the teacher and students.

Referring once again to FIG. 16, it is noted that displays for the teacher to view, and displays for the students to view, may be placed back-to-back along a line at right angles to the direct line between students and either the teacher in the local classroom, or the teacher display in the remote classrooms. As has been explained, there are, up to this point, two displays in each classroom dedicated to each student. That is a student S3 in a remote classroom 3 will have two dedicated displays in the local classroom, one for the teacher to view, facing toward the teacher, away from the local students, and one for the local students to view, facing toward the local students and away from the teacher, and these two dedicated displays will be back to back, so the gaze angle toward an appropriate display will be essentially the same for the teacher and the student.

Figure 22:
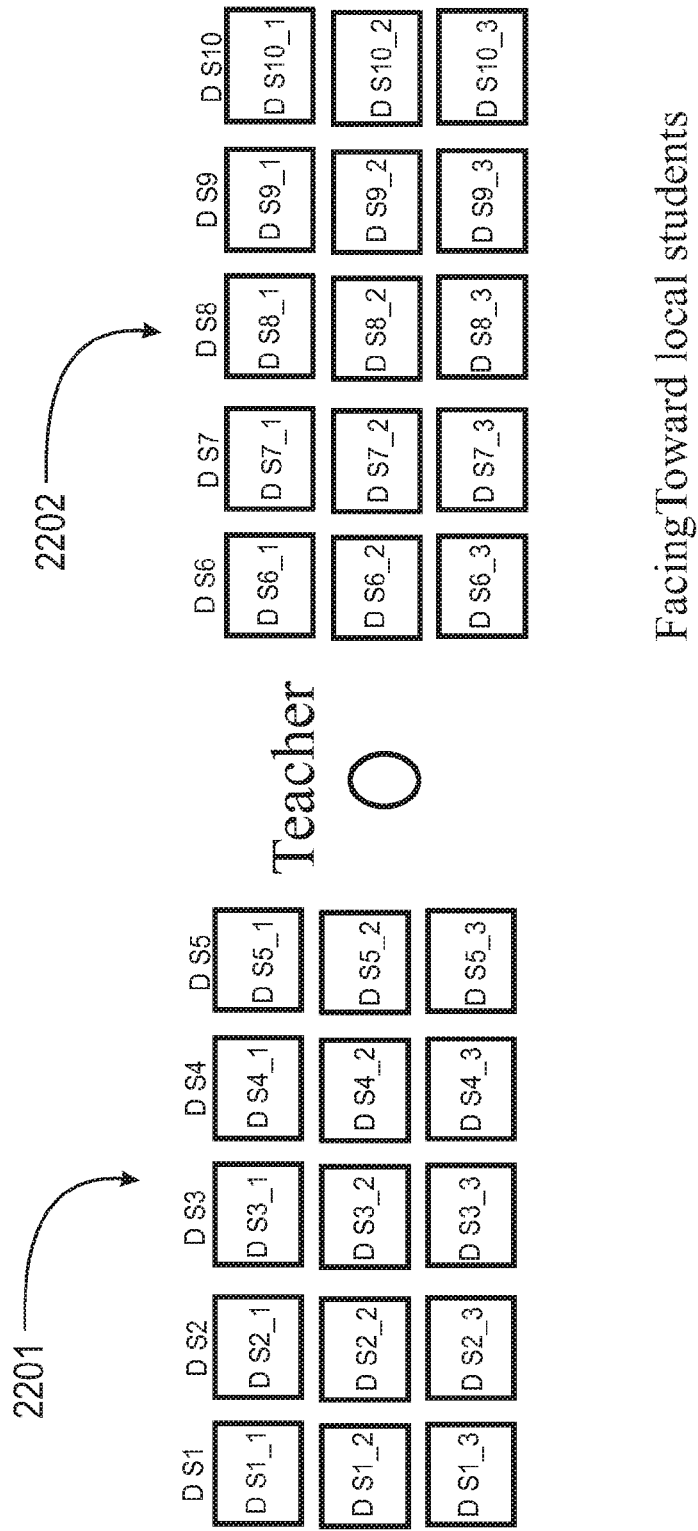
FIG. 22 illustrates an alternative embodiment for display arrangement to provide an immersive view in an embodiment of the invention.

In another embodiment of the invention there may be more than one display facing toward the students, dedicated to a single other student interacting in a remote classroom from the classroom supporting the display array. FIG. 22 shows a straight on view from the position of local students in a local classroom, looking toward the teacher. There are displays in this example dedicated to ten (10) remote students, considered as S1 through S10. Displays are arranged along a line orthogonal to the direct line between the teacher and the local students, as shown in FIG. 16, and described above with reference to that figure.

A significant difference in FIG. 22 is that there are now three displays facing the local students, dedicated to each of the ten remote students, for a grand total of thirty displays. Note that a three display set, D S1, is dedicated to student S1, and the displays are arranged vertically, one above another as D S1_1, D S1_2, D S1_3. It should be remembered that there is also a three-display set immediately behind set D S1, facing the instructor, with back-to-back displays mapped to the same feed for the same remote student. So there will really be a total of sixty displays for this circumstance in the local classroom. The fact of multiple displays in the classroom dedicated to each remote student enables display of each remote student from different viewpoints, and in enhanced detail.

Figure 23:
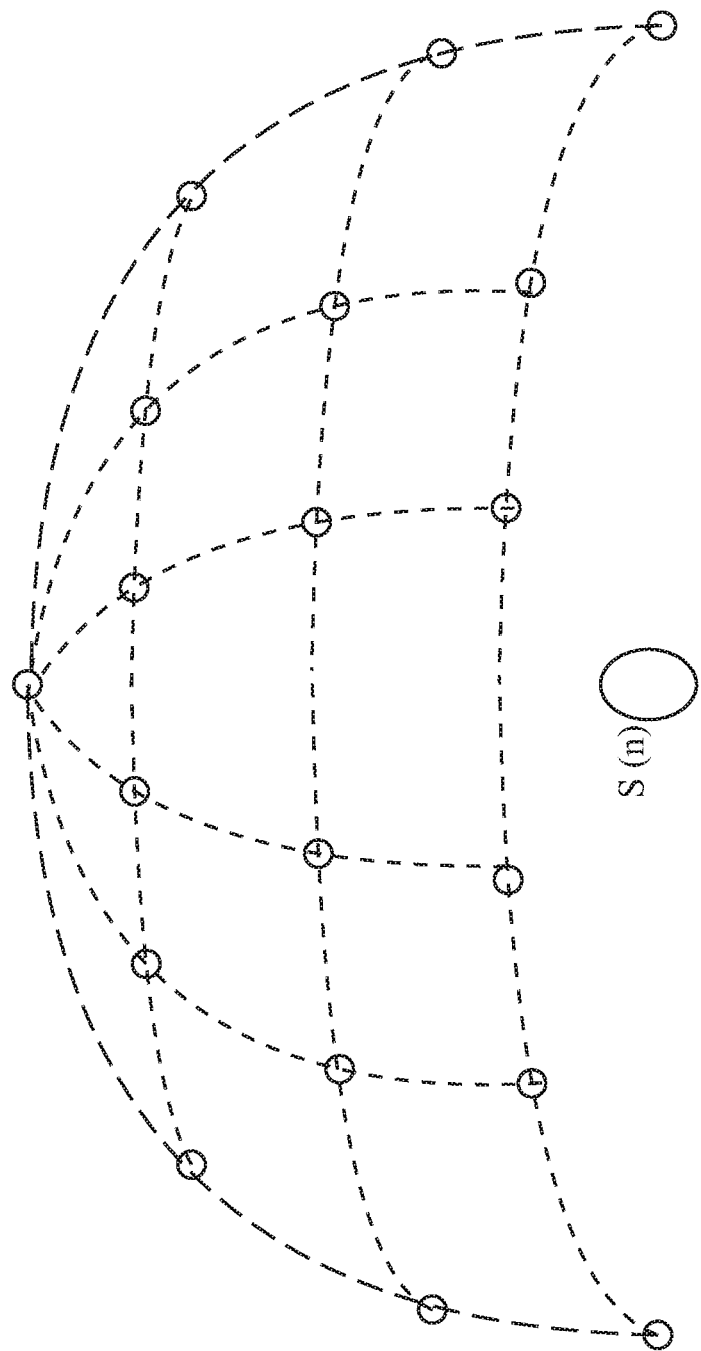
FIG. 23 illustrates a geometric placement of cameras in an embodiment of the invention.

To have sufficient video feeds from a plurality of viewpoints for each remote student will of course require a greater number of video cameras, and a more sophisticated placement and orientation area of the cameras. FIG. 23 illustrates a matrix for camera placement. In this example cameras are placed as though on an inner hemispherical surface, centered on a subject for which video feeds are desired. The subject in this example is a student S (n). Small circles represent cameras. There are 19 cameras in this example, but the number could be smaller, or very much larger. Hemisphere arrangement may be provided for a teacher, and for any student or collection of students. The hemispherical arrangement provides even more nuanced associated of feeds with displays. Again, the feeds may be mapped to displays as arranged, for example, in FIG. 22, and mapping will generally be by considering gaze direction according to states of the participants in the system.

As heretofore described the system of the invention automatically performs state switching based on recognition of physical and/or audio gestures of the MCP participants, whether local or remote, and switches, pairs and maps capture and display devices accordingly to provide the appropriate view and audio perception to the MCP participants. However, it should be noted that in some situations the teacher, being the facilitator and the primary information source of the multiple engagements which may exist in practice of the invention, as deemed necessary, may manually override the various automatic system switching that may occur. For example, if a student gesture from one classroom occurs simultaneously to that of a student in another classroom, the teacher may either accept or override the automatic system selection of feed switching by any variety of wired or wireless means, such that the teacher's desired engagement may be realized by the system.

The MCP system architecture and specific classroom designs described and illustrated heretofore represent preferred embodiments which enable practice of the invention based on empirical experimentation. However, the invention shall not be limited to the specific examples of the disclosure described thus far. There may be more or less remote classrooms in the MCP environment which would in turn necessitate more or less capture and display devices arranged in different patterns and angles. Further, remote classrooms in practice of the invention may include such environments as a remote location having a single remote participant with a video/audio capture device and one or more display devices.

Although the invention has been described with reference to several exemplary embodiments, it is understood that the words that have been used are words of description and illustration, rather than words of limitation. Changes may be made within the purview of the claims as presently stated without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and are not drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. An e-learning system comprising:
a local classroom comprising a local student station, including a local student microphone, and an instructor station, including an instructor microphone, such that local students at the local student station and an instructor at the instructor station face each other directly along a first viewing line;
a plurality of remote classrooms of a specific number, each having a student station, a remote student microphone, and an instructor display, including an instructor audio speaker, such that remote students are enabled to view the instructor display;
a plurality of video cameras in each of the local and remote classrooms, individual ones of the video cameras positioned and oriented to capture video images of the instructor, the local students and the remote students as subjects;
a first plurality of video displays in the local classroom arranged along a line orthogonal to the first viewing line and all facing the local student station, the first plurality of video displays comprising first sets of at least two displays, arranged vertically one above another, each first set of at least two displays dedicated to one of the remote classrooms, with an equal number of sets positioned side-by-side to each side of the first viewing line;
a second plurality of video displays in the local classroom arranged along the line orthogonal to the first viewing line and all facing the instructor station, the second plurality of video displays comprising second sets of at least two displays, arranged vertically one above another, each second set of at least two displays dedicated to one of the remote classrooms, with an equal number of sets positioned side-by-side to each side of the first viewing line, and with first and second sets dedicated to the same remote classroom positioned back to back, first sets facing the student station and second sets facing the instructor station;
first connection apparatus at the local classroom connecting electronic elements of the local classroom to a network;
second connection apparatus at each of the remote classrooms connecting electronic elements of the remote classrooms to the network; and
a server having a processor executing coded instructions from a non-transitory physical medium, the server connected through the network to the first and second connection apparatus, the server executing the software coordinating video and audio transmission between the classrooms;
wherein feeds from the plurality of video cameras are mapped to individual sets of the first and second plurality of the video displays, with different video feeds of a same subject, but having a different viewpoint of that subject, mapped to each of the at least two displays in each set, providing a variable view of the same subject for a viewer.

2. The system of claim 1 wherein the system operates in exclusive states, and in a first exclusive state the instructor lectures to both the local students and the remote students.

3. The system of claim 2 wherein in a second exclusive state the instructor engages exclusively with one or more students in a specific one of the remote classrooms.

4. The system of claim 2 wherein in a third exclusive state the instructor interacts exclusively with one or more of the local students.

5. The system of claim 2 wherein in a fourth exclusive state one of the local students and one of the first remote students interact with one another.

6. The system of claim 1 wherein the network is the Internet network.

7. The system of claim 1 wherein each set of video displays comprises two displays dedicated to a common subject, one display above the other in a common plane.

8. The system of claim 1 wherein each set of video displays comprises three or more displays dedicated to a common subject, arranged vertically, one above another in the set.

9. The system of claim 1 wherein, among the plurality of video cameras, a sub-set of video cameras is arranged in each of the remote classrooms patterned in an array as on an interior surface of a hemisphere.

* * * * *